United States Patent
Shiga et al.

(10) Patent No.: US 6,883,741 B2
(45) Date of Patent: Apr. 26, 2005

(54) MAGNETIC TAPE CARTRIDGE

(75) Inventors: Hideaki Shiga, Kanagawa-ken (JP); Yusuke Ishihara, Kanagawa-ken (JP); Kiyoo Morita, Kanagawa-ken (JP); Daisuke Takahashi, Kanagawa-ken (JP); Seiji Tsuyuki, Kanagawa-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/667,366

(22) Filed: Sep. 23, 2003

(65) Prior Publication Data

US 2004/0056134 A1 Mar. 25, 2004

Related U.S. Application Data

(62) Division of application No. 10/197,829, filed on Jul. 19, 2002, now Pat. No. 6,659,380, which is a division of application No. 09/762,563, filed as application No. PCT/JP99/03250 on Jun. 18, 1999, now Pat. No. 6,648,259.

(30) Foreign Application Priority Data

Aug. 12, 1998 (JP) .......................................... 10-227737
Aug. 25, 1998 (JP) .......................................... 10-238375

(51) Int. Cl.[7] ........................................... G11B 23/107
(52) U.S. Cl. .................................. 242/348.2; 360/132
(58) Field of Search .............................. 242/348, 348.2; 360/132

(56) References Cited

U.S. PATENT DOCUMENTS

| | | | |
|---|---|---|---|
| 4,027,832 A | 6/1977 | Lopata | |
| 4,364,529 A | 12/1982 | Barto, Jr. et al. | |
| 4,452,406 A | 6/1984 | Richard | |
| 4,717,090 A | 1/1988 | Smith et al. | |
| 5,303,875 A | 4/1994 | Hoge et al. | |
| 5,379,167 A | 1/1995 | Robles et al. | |
| 5,465,187 A | 11/1995 | Hoge et al. | |
| 6,003,802 A | 12/1999 | Eaton et al. | |
| 6,349,016 B1 | 2/2002 | Morita et al. | |

FOREIGN PATENT DOCUMENTS

| | | |
|---|---|---|
| DE | 92 17 315 U1 | 4/1993 |
| EP | 0 398 671 A2 | 11/1990 |
| JP | 7-14344 | 1/1995 |
| JP | 7-503805 | 4/1995 |

*Primary Examiner*—John Q. Nguyen
(74) *Attorney, Agent, or Firm*—Sughrue Mion, PLLC

(57) ABSTRACT

A magnetic tape cartridge includes a cartridge casing formed by upper and lower casing halves connected together, and a single reel around which a magnetic tape with a leader pin fixed to the leading end of the magnetic tape is wound and which is contained in the cartridge casing for rotation. The leader pin is removably held in a tape draw-out opening with its axial direction directed in the vertical direction under urging force of a spring member acting on its upper and lower end portions sideways with the upper and lower end portions received in recesses respectively formed in the upper and lower casing halves. An inclined surface directed obliquely downward is formed at least a part of the side wall of the recess formed in the upper casing half opposed to the direction in which the spring member urges the leader pin.

1 Claim, 25 Drawing Sheets

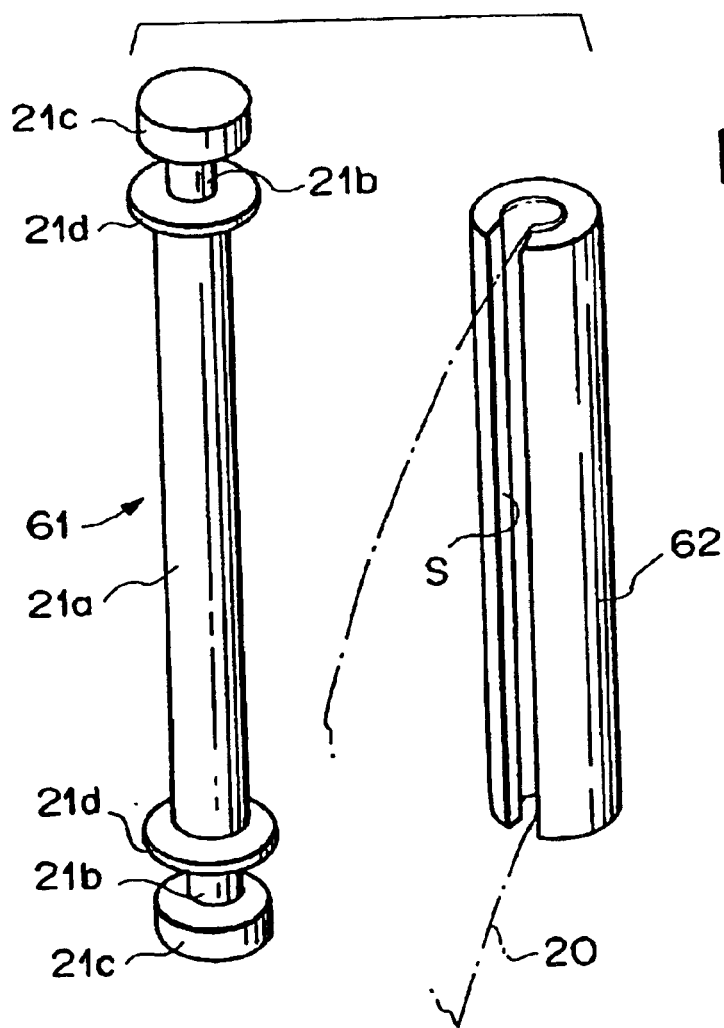
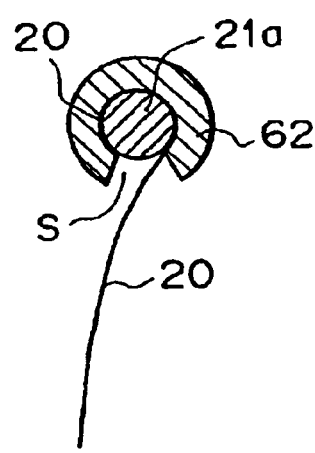
FIG. 5A
FIG. 5B

F I G. 14
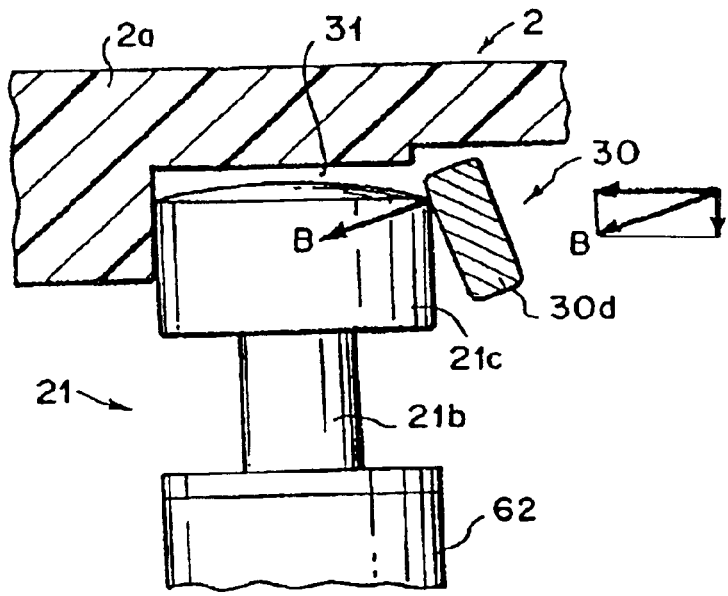
F I G. 15
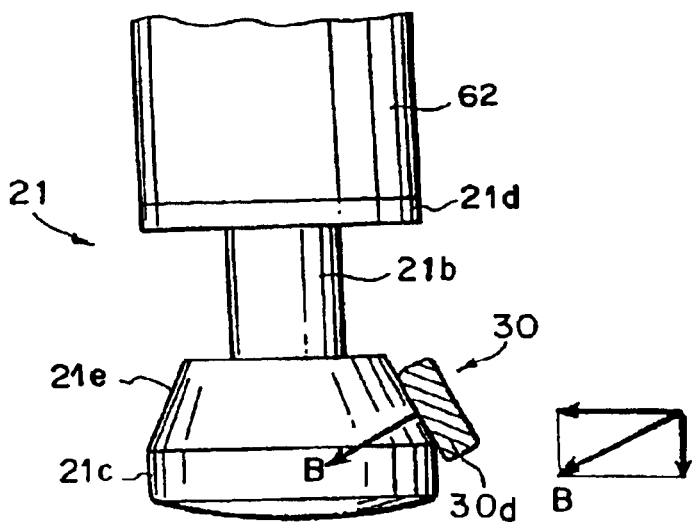

F I G . 35
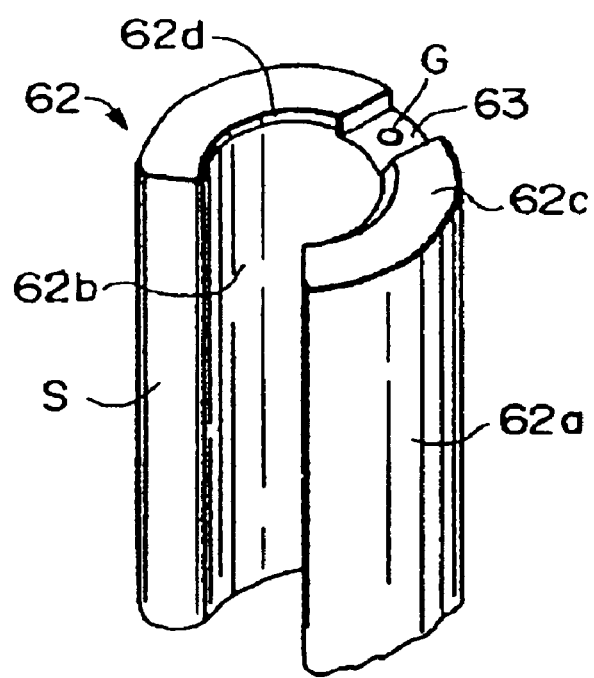

F I G. 40
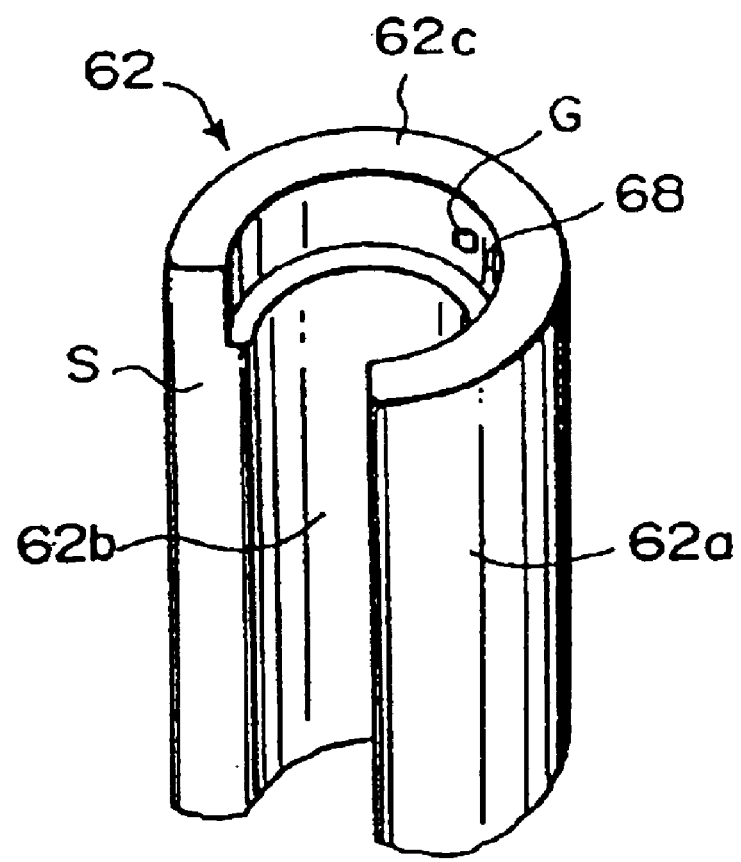

MAGNETIC TAPE CARTRIDGE

This is a divisional of application Ser. No. 10/197,829 filed Jul. 19, 2002, now U.S. Pat No. 6,659,380 which is a divisional of application Ser. No. 09/762,563 filed Feb. 9, 2001, now U.S. Pat. No. 6,648,259 which is a 35 U.S.C. § 371 of International Application No. PCT/JP99/03250 filed Jun. 18, 1999; the disclosures of which is incorporated herein by reference.

FIELD OF THE INVENTION

This invention relates to a magnetic tape cartridge comprising a cartridge casing and a single reel which is housed in the cartridge casing for rotation and around which a magnetic tape is wound.

BACKGROUND OF THE INVENTION

As a recording medium for use as a backup for a computer memory, there has been known a magnetic tape cartridge comprising a magnetic tape wound around a single reel and a flat cartridge casing which is formed of square upper and lower casing halves fastened together and in which the reel is housed for rotation.

Since the magnetic tape is used for storing important information, the magnetic tape cartridge is structured so that trouble such as tape jam does not occur and the magnetic tape is not accidentally drawn out.

A leader member (e.g., a leader pin) is fixed to the leading end of the magnetic tape and the recording and reproducing apparatus is arranged to catch the leader member to draw out the magnetic tape from the magnetic tape cartridge to a position where information recorded on the tape can be read out and information can be recorded on the tape. The leader pin is removably held on the cartridge casing. It is advantageous for the purpose of simplification of the structure to hold the leader on the cartridge casing by use of a spring member.

When a leader pin is employed as the leader member, the leader pin generally comprises a central shaft portion to which the leading end portion of the magnetic tape is fixed, a pair of thin shaft portions formed on opposite ends of the central shaft portion, and a pair of head portions which formed on outer sides of the thin shaft portions and is of substantially the same diameter as the central shaft portion. The thin shaft portions form engagement portions which are brought into engagement with a tape draw-out mechanism of a recording and reproducing apparatus when the magnetic tape cartridge is loaded in the recording and reproducing apparatus. The head portions on opposite ends of the leader pin are brought into engagement with leader pin holding recesses formed in the upper and lower casing halves inside the tape draw-out opening. A spring member formed of a plate spring or the like resiliently abuts against the outer peripheral surfaces of the head portions sideway and removably holds the leader pin in the leader pin holding recesses with the axial direction of the leader pin directed in the vertical direction.

The tape draw-out mechanism of the recording and reproducing apparatus is arranged on the assumption that the lower end of the leader pin is located at a predetermined distance from the lower surface of the magnetic tape cartridge, i.e., the bottom surface of the lower casing half of the cartridge casing. That is, it necessary that the leader pin received in the cartridge casing should be constantly held in place in the axial direction thereof.

However, to nullify clearances above and below the leader pin in the leader pin receiving portion is impossible due to limitation in processing accuracy and/or assembling accuracy of the cartridge casing, and is very difficult due to limitation in accuracy of the recording and reproducing apparatus. Accordingly, there exist clearances above and below the leader pin in the cartridge casing, and the leader pin can be displaced from the correct position in its axial direction due to inaccuracy when the leader pin is inserted, and/or to drop impact or vibration during transportation or handling of the magnetic tape cartridge.

In order to overcome these problems, a first object of the present invention is to provide a leader pin locating structure which can confine downward the leader pin held in the cartridge casing.

When the leader pin is taken out from the cartridge casing by the tape draw-out mechanism of the recording and reproducing apparatus, and when the leader pin is returned to the cartridge casing by the tape draw-out mechanism, a part of the spring member is deformed in response to movement of the leader pin. Especially when the spring member is of a plate spring, the edge of the deformed part can scratch the inner surface of the cartridge casing to increase frictional resistance. The increased frictional resistance changes load on the spring member and makes instable the action of the spring member. At the worst, the spring member can be caught by the inner surface of the cartridge casing, and the leader pin can be disabled from being taken out from and received in the cartridge casing.

Further, when the edge of the spring member of metal scratches the inner surface of the casing every time the leader pin is taken in and out the cartridge casing by the tape draw-out mechanism of the recording and reproducing apparatus, the inner surface of the cartridge casing is scraped and shavings can adhere to the surface of the magnetic tape to cause drop out.

Thus a second object of the present invention is to provide a spring member mounting structure which can stabilize the action of the spring member for holding the end portion of the leader pin and can prevents the inner surface of the cartridge casing from being scraped.

Further, the spring member for holding the end portion of the leader pin is required to be simple in structure, to be able to surely hold the leader pin and to be able to be easily incorporated in the cartridge casing.

Accordingly, a third object of the present invention is to provide a spring member which meets such requirements.

The leader pin is required to be simple in structure, to be able to surely and easily clamp the leading end portion of the magnetic tape, and keeps strong clamping force irrespective of environment.

Accordingly, a fourth object of the present invention is to provide a leader pin which can meet such requirements and is provided with a which is less in creep and stress relaxation.

When the leader pin is provided with a clamp member of synthetic resin, injection molding, which can form products of a complicated shape at high efficiency with a high dimensional accuracy, is very useful. However, the injection molding is disadvantageous in that a gate mark projects beyond the surface of the product, which causes a problem in dimensional accuracy.

Thus a fifth object of the present invention is to provide a leader pin having a clamp member whose gate mark is positioned not to adversely affect function of the leader pin.

SUMMARY OF THE INVENTION

In order to accomplish the first object, a first aspect of the present invention provides a magnetic tape cartridge characterized in that an inclined surface directed obliquely downward is formed at least a part of the side wall of the recess formed in the upper casing half opposed to the direction in which the spring member urges the leader pin. The inclined surface may be curved. An inclined surface may be additionally provided in a side wall of the inlet portion of the recess in the upper casing half.

By providing such an inclined surface, the leader pin is constantly urged downward by the force of the spring member, whereby the leader pin is prevented from being moved upward by drop impact and/or vibration during transportation, and the leader pin can be kept on a level conforming to the tape draw-out mechanism of the recording and reproducing apparatus. Further, when an inclined surface is additionally provided in a side wall of the inlet portion of the recess in the upper casing half, the leader pin can be confined downward under counterforce to the leader pin insertion force of the member of the recording and reproducing apparatus.

Further, in order to accomplish the first object, a second aspect of the present invention provides a magnetic tape cartridge characterized in that a guide surface inclined downward in the direction of insertion of the leader pin into the recess in the upper casing half is provided on the lower surface of the top wall of the upper casing half at the inlet portion of the recess.

The guide surface may extend from the edge of the tape draw-out opening deep to the interior of the recess or from the edge of the tape draw-out opening to a position near the center of the upper head portion of the leader pin. Otherwise, the guide surface may extend from the edge of the tape draw-out opening to the upper head portion of the leader pin.

By providing such a guide surface, the leader pin can be confined downward when the leader pin is inserted into the recess by the member of the recording and reproducing apparatus.

In order to accomplish the first object of the present invention, a third aspect of the present invention provides a magnetic tape cartridge characterized in that the urging force of the spring member applied to the head portion of the leader pin has a component which urges downward the leader pin.

In this case, the head portion of the leader pin may be provided with an inclined surface facing obliquely upward so that the force of the spring member acting on the inclined surface generates the component which urges downward the leader pin. By the component which urges downward the leader pin, the leader pin can be confined downward.

In order to accomplish the first object of the present invention, a fourth aspect of the present invention provides a magnetic tape cartridge characterized in that a recess or a cutaway portion is provided in the head portion of the leader pin and an engagement portion adapted to be engaged with the recess or the cutaway portion if provided on the spring member. With this arrangement, the leader pin can be confined downward by the spring member.

In this case, the recess or the cutaway portion may be in the form of a groove formed in the outer peripheral surface of the head portion. Further, the recess or the cutaway portion may be in the form of a step formed by cutting an upper portion of the outer peripheral surface of the head portion of the leader pin so that an engagement portion of the spring member engaged with the step urges the leader pin also downward. Further, in this case, it is preferred that the lower surface of the engagement portion of the spring member be inclined in the direction of insertion of the leader pin so that the downward urging force is increased as the leader pin is inserted deep into the tape draw-out opening.

In order to accomplish the first object of the present invention, a fifth aspect of the present invention provides a magnetic tape cartridge characterized in that at least the lower head portion of the leader pin is formed of a magnetic material and a permanent magnet is embedded in the lower casing half of the cartridge casing in a place with which the lower head portion of the leader pin is brought into contact.

In order to accomplish the first object of the present invention, a sixth aspect of the present invention provides a magnetic tape cartridge characterized in that a ball plunger which presses downward the leader pin is embedded in the upper casing half of the cartridge casing at a portion opposed to the upper head portion of the leader pin. With these arrangement, the leader pin can be confined downward.

Further, in order to accomplish the first object of the present invention, a seventh aspect of the present invention provides a magnetic tape cartridge characterized in that a second urging means for urging downward the leader pin is provided on the upper casing half of the cartridge casing, and the maximum load point on the leader pin by the first urging means and that by the second urging means are displaced from each other in the direction of insertion of the leader pin. With this arrangement, the leader pin can be confined downward under the urging force of the second urging means. At the same time, since the maximum load point on the leader pin by the first urging means and that by the second urging means are displaced from each other in the direction of insertion of the leader pin, the leader pin can be prevented from being inserted and held in an inclined state due to imbalance of transverse urging forces acting on the leader pin at its upper portion and lower portion.

Further, in order to accomplish the first object of the present invention, an eighth aspect of the present invention provides a magnetic tape cartridge characterized in that the slide door is provided on the back side thereof with a rib having an inclined surface which is brought into abutment against the upper surface of the head portion of the leader pin and presses downward the leader pin in response to movement of the slide door to the closing position. Also with this arrangement, the leader pin can be confined downward.

In order to accomplish the second object of the present invention, a ninth aspect of the present invention provides a magnetic tape cartridge characterized in that the spring member comprises a base portion which is mounted on the inner surface of the upper or lower casing half of the cartridge casing and an arm portion which extends from the base portion and can be deflected to removably hold the upper or lower end portion of the leader pin, and the edge of the arm portion opposed to the inner surface of the cartridge casing is provided with a cutaway portion for preventing the arm portion from being brought into contact with the inner surface of the cartridge casing.

With this arrangement, action of the spring member is stabilized and the problem that the inner surface of the cartridge casing is scraped can be overcome.

In this case, it is preferred that the spring member is a single member comprising a base portion and upper and lower arm portions extending from upper and lower portions of the base portion.

In order to accomplish the second object of the present invention, a tenth aspect of the present invention provides a magnetic tape cartridge characterized in that the spring member comprises a base portion which is mounted on the inner surface of the upper or lower casing half of the cartridge casing and an arm portion which extends from the base portion and can be deflected to removably hold the upper or lower end portion of the leader pin, and the inner surface of the cartridge casing opposed to the arm portion is recessed with respect to the inner surface of the cartridge casing opposed to the base portion. Also with this arrangement, the arm portion can be prevented from being brought into contact with the inner surface of the cartridge casing when it is deflected.

In order to accomplish the third object of the present invention, an eleventh aspect of the present invention provides a magnetic tape cartridge characterized in that the spring member is a single member comprising a base portion and upper and lower arm portions which extend from upper and lower portions of the base portion and can be deflected to removably hold the upper or lower end portion of the leader pin.

When the spring member is of this arrangement, the spring member can be incorporated in the cartridge casing by fastening together the upper and lower casing halves, and accordingly, incorporation of the spring member is facilitated and the number of parts is reduced, whereby cost can be reduced.

In this case, it is preferred that the spring member be provided with upper and lower arm portions for incorporation in addition to the upper and lower arm portions for holding the leader pin, with the upper and lower arm portions for incorporation being symmetrical with the upper and lower arm portions for holding the leader pin so that the spring member is symmetrical about both its horizontal and vertical axes, whereby the spring member becomes nondirectional and incorporation of the spring member in the cartridge casing is further facilitated.

In this case, it is preferred that cutaway portions into which the arm portions for incorporation are inserted be formed in the inner surface of the cartridge casing.

When the spring member is a single member comprising a base portion and upper and lower arm portions which extend from upper and lower portions of the base portion and can be deflected to removably hold the upper or lower end portion of the leader pin, it is preferred that the spring member be further provided with a pressing piece which presses downward the leader pin in the axial direction of the leader pin.

Further, when the spring member is a single member comprising a base portion and upper and lower arm portions which extend from upper and lower portions of the base portion and can be deflected to removably hold the upper or lower end portion of the leader pin, it is preferred that the spring member be formed by bending opposite end portions of a line spring like a hairpin so that the opposite end portions form the upper and lower arm portions and the middle portion forms the base portion.

In this case, the spring member can be fixed to the cartridge casing by bending an intermediate portion of the base portion to form a mounting portion, forming in each of the upper and lower casing halves a spring member mounting groove which opens the mating surface of the casing half, and mating the upper and lower casing halves so that the respective mating surfaces are opposed to each other with a part of the mounting portion of the spring member received in the spring member mounting groove of one of the upper and lower casing half and the other part of the mounting portion received in the spring member mounting groove of the other of the upper and lower casing halves.

In order to accomplish the second and third objects of the present invention, a twelfth aspect of the present invention provides a magnetic tape cartridge characterized in that the spring member comprises a pair of line springs each of which is provided with an arm portion which is deflected to removably hold an end portion of the leader pin, and a cutaway portion for preventing the arm portion from being brought into contact with the inner surface of the cartridge casing when the arm portion is deflected is formed in the arm portion of at least one of the line springs.

In order to accomplish the third object of the present invention, a thirteenth aspect of the present invention provides a magnetic tape cartridge characterized in that the spring member comprises a pair of line springs each of which comprises a pair of arm portions extending substantially in parallel to each other from a bight portion, one of the arm portions being arranged to removably hold an end portion of the leader pin and the other arm portion being used for incorporating the spring member in the cartridge casing, the inner diameter of the bight portion being substantially equal to the outer diameter of a support pin and a retainer portion in the form of a projection being formed on the inner side of a portion between the bight portion and the arm portion for incorporating the spring member in the cartridge casing.

In order to accomplish the fourth object of the present invention, a fourteenth aspect of the present invention provides a magnetic tape cartridge comprising a cartridge casing, and a single reel around which a magnetic tape with a leader pin fixed to the leading end thereof is wound and which is contained in the cartridge casing for rotation, wherein the improvement comprises that the leader pin comprises a pin body with a central shaft portion, and a clamp member which is formed by synthetic resin, is provided with an axial slit to be C-shaped in cross-section, and is resiliently press-fitted on the central shaft portion through the slit with the leading end portion of the magnetic tape pinched between the inner wall surface of the clamp and the outer surface of the central shaft portion, whereby the leading end portion of the magnetic tape is fixed to the leader pin.

It is preferred that a chamfered portion be formed along the inner peripheral surface of the end face of the clamp member so that the chamfered portion acts as a guide surface which guide the clamp member when it is press-fitted on the central shaft portion.

It is preferred that the clamp member be formed of synthetic resin which is 130° C. or higher in deflection temperature under load.

Otherwise it is preferred that the clamp member be formed of synthetic resin which is 220° C. or higher in melting temperature or softening temperature.

When the clamp member is formed of synthetic resin, the clamp member is normally under stress in the direction in which the clamp member is press-fitted on the central shaft portion. Accordingly, there is a problem that when the magnetic tape cartridge is stored or used at an elevated temperature or in a high-temperature high-humidity atmosphere, the tape clamping force deteriorates due to creep (permanent deformation generated when subjected to constant stress within limit of elasticity for a long time) and stress relaxation (a phenomenon that the stress necessary to generate predetermined strain is gradually reduced with time). When the clamp member is formed of synthetic resin which is 130° C. or higher in deflection temperature under load or synthetic resin which 220° C. or higher in melting temperature or softening temperature, the problem that the tape clamping force deteriorates when the magnetic tape cartridge is stored or used at an elevated temperature or in a high-temperature high-humidity atmosphere can be overcome.

It is preferred that the clamp member be formed of synthetic resin reinforced with glass fiber or the like.

The synthetic resin reinforced with such fiber is higher in deflection temperature under load than resin not reinforced. Accordingly, even synthetic resin which is lower than 130° C. in deflection temperature under load by itself can be used for forming the clamp member by reinforcing with fiber.

In order to accomplish the fifth object of the present invention, a fifteenth aspect of the present invention provides a magnetic tape cartridge comprising a cartridge casing, and a single reel around which a magnetic tape with a leader pin fixed to the leading end thereof is wound and which is contained in the cartridge casing for rotation, wherein the improvement comprises that the leader pin comprises a pin body with a central shaft portion, and a clamp member which is formed by synthetic resin, is provided with an axial slit to be C-shaped in cross-section and is resiliently press-fitted on the central shaft portion through the slit with the leading end portion of the magnetic tape pinched between the inner wall surface of the clamp and the outer surface of the central shaft portion, whereby the leading end portion of the magnetic tape is fixed to the leader pin, and a recess is formed on at least one of the end faces with a gate mark formed in the recess.

Otherwise, an end face of the clamp member is obliquely cut on opposite sides of the slit to form an inclined guide surface, and a gate mark is formed on the inclined guide surface.

The outer surface of the clamp member opposite to the slit may be cut partly or over the entire length of the clamp member to form a flat surface and the gate mark may be formed on the flat surface.

The inner surface of the clamp member may be thinned over the entire periphery at least at a part adjacent to one end face to form a recess on the inner surface and the gate mark may be formed on the recess.

The inner surface of the clamp member may be partly thinned to form a recess extending in the axial direction of the clamp member and the gate mark may be formed on the recess.

When the gate mark is formed in sites described above, the gate mark cannot project beyond the basis contour of the clamp member. Accordingly, the aforesaid problems of unsatisfactory press-fitting of the clamp member on the central shaft portion of the leader pin, deterioration in positional accuracy, damage of the magnetic tape or interference of the leader pin with a component of the tape drive apparatus can be overcome and function of the leader pin can be ensured.

BRIEF DESCRIPTION OF THE DRAWINGS

FIG. 5A is an exploded perspective view of the leader pin shown in FIG. 4, FIG. 5B is a transverse cross-sectional view of the leader pin fixed to the end of the magnetic tape, FIGS. 14 and 15 are enlarged fragmentary cross-sectional views showing leader pin locating structures in accordance with still other embodiments of the present invention.

PREFERRED EMBODIMENTS OF THE INVENTION

Preferred embodiment of the present invention will be described with reference to the drawings, hereinbelow.

Figure 1:
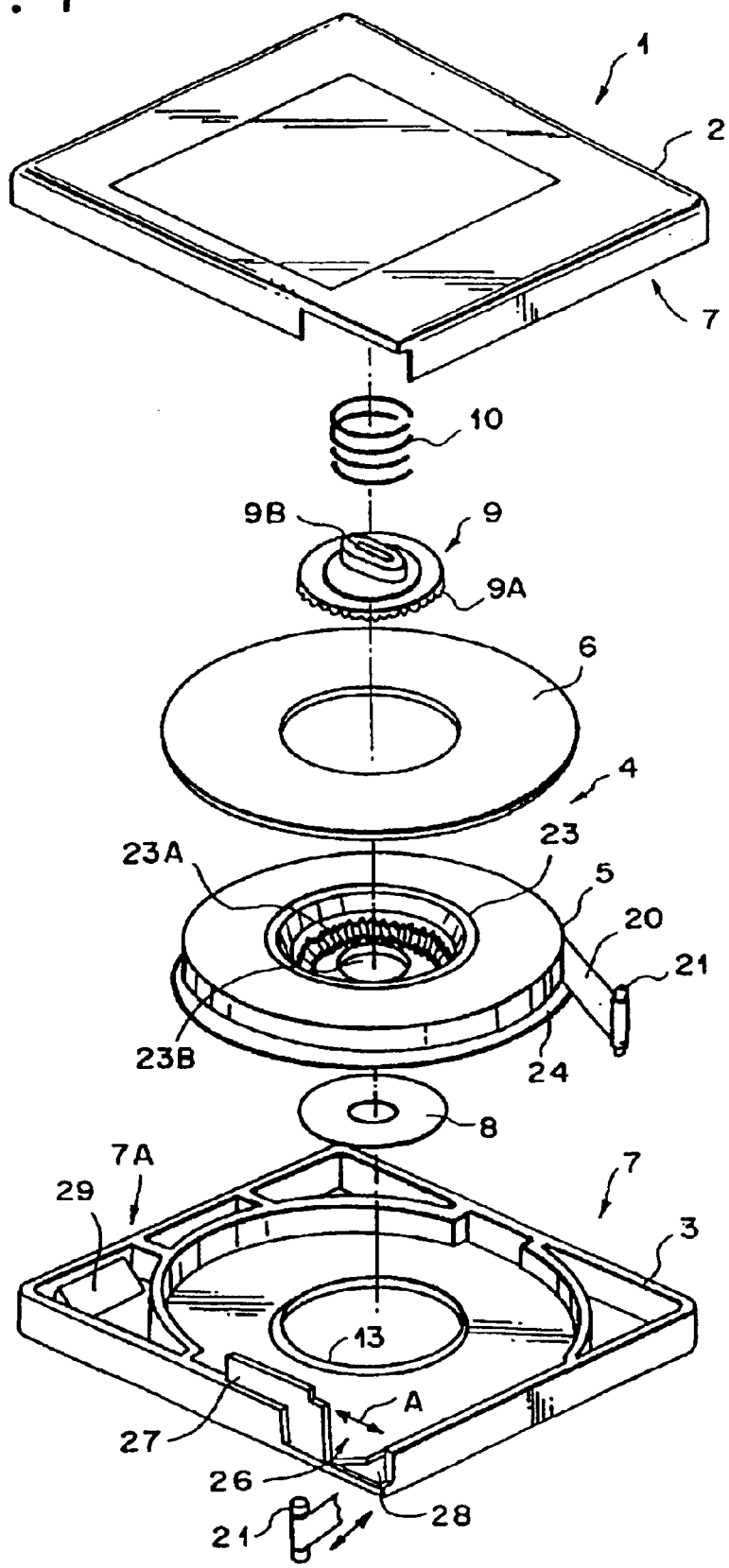
FIG. 1 is an exploded perspective view of a magnetic tape cartridge in accordance with the present invention.

FIG. 1 is an exploded perspective view showing a magnetic tape cartridge in accordance with an embodiment of the present invention.

As shown in FIG. 1, the magnetic tape cartridge 1 comprises a flat rectangular cartridge casing 7 of hard plastic which is formed by fastening together upper and lower casing halves 2 and 3, which are rectangular in plan, by fasteners such as screws at their four corners, and a single reel 4 around which magnetic tape 20 is wound is housed for rotation in the cartridge casing 7. A circular opening 13 is formed at the center of the bottom wall of the lower casing half 3.

The reel 4 is formed by bonding together a lower reel half 5 and an upper reel half 6 by ultrasonic welding or the like. The lower reel half 5 comprises a cylindrical hub 23 and a flange 24 which are integrally molded from synthetic resin. A reel plate 8 for magnetically connecting a drive mechanism of a tape drive apparatus (recording and reproducing apparatus) is mounted on the outer bottom surface of the hub 23. Further on the inner bottom surface of the hub 23, is formed a stopper gear 23A which is brought into engagement with a brake gear 9A formed on a brake button 9 and prevents rotation of the reel 4 when the magnetic tape cartridge 1 is not being used. The hub 23 is provided with an opening 23B, through which a brake release spindle in the tape drive apparatus is inserted to push upward the brake button 9.

The brake button 9 is provided with said brake gear 9A at the lower end thereof and with a groove 9B at the upper end thereof. The groove 9B receives a guide projection (not shown) formed in the upper casing half 2. The brake button 9 is urged downward by a coiled spring 10 and is normally received in the hub 23, where the brake gear 9A and the stopper gear 23A are in mesh with each other to prevent rotation of the reel 4. When the magnetic tape cartridge 1 is loaded in the tape drive apparatus, the brake release spindle of the tape drive apparatus pushes upward the brake button 9, whereby the gears 9A and 23A are disengaged from each other to permit rotation of the reel 4.

A tape draw-out opening 26 through which the magnetic tape 20 is drawn out is formed in a side wall of the cartridge casing 7. The tape draw-out opening 26 is closed and opened by a slide door 27 which is slidable in the directions of double-headed arrow A and is urged in the closing position by a spring not shown.

A leader pin 21 is fixed to the leading end of the magnetic tape 20 and when the magnetic tape cartridge 1 is not used, the magnetic tape 20 is entirely wound around the reel 4 with the leader pin 21 held in recesses 28 formed near the tape draw-out opening 26.

When the magnetic tape cartridge 1 is loaded in a tape drive apparatus, the gears 23A and 9A of the hub 23 and the brake button 9 are disengaged from each other to permit rotation of the reel 4 in the manner described above and the drive mechanism of the tape drive apparatus holds the reel plate 8 under magnetic force and rotates the reel 4. At the same time, the slide door 27 is opened and the leader pin 21 is brought to a predetermined position in a tape running path, thereby recording or reproduction becomes feasible.

A non-contact memory element 29 on which the contents or the like of the information recorded on the magnetic tape 20 are recorded by a non-contact system such as an electromagnetic induction system and the information recorded on which is read out by a non-contact system such as an electromagnetic induction system is held in a corner portion of the lower casing half 3 of the cartridge casing 7. The memory element 29 is a rectangular plate-like member.

Figure 2:
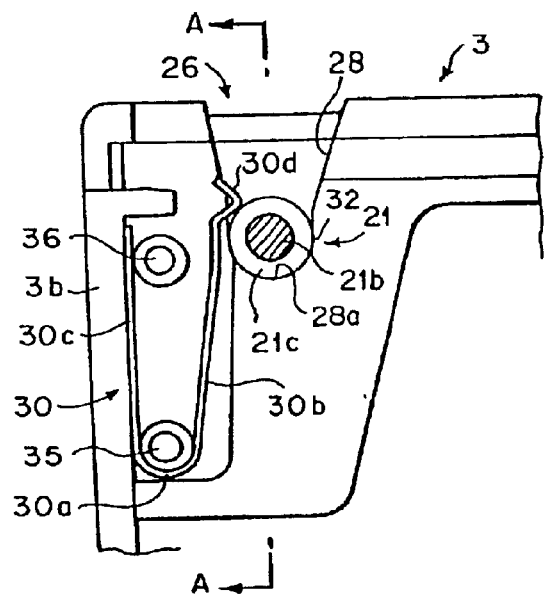
FIG. 2 is a fragmentary plan view showing the leader pin holding structure of the lower casing half of the cartridge casing shown in FIG. 1.
Figure 3:
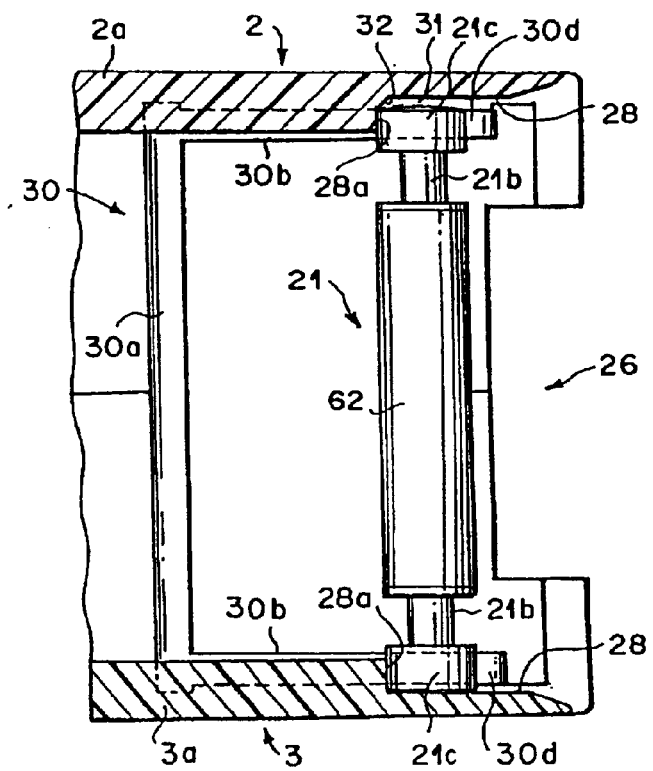
FIG. 3 is a cross-sectional view taken along line A—A in FIG. 2.
Figure 4:
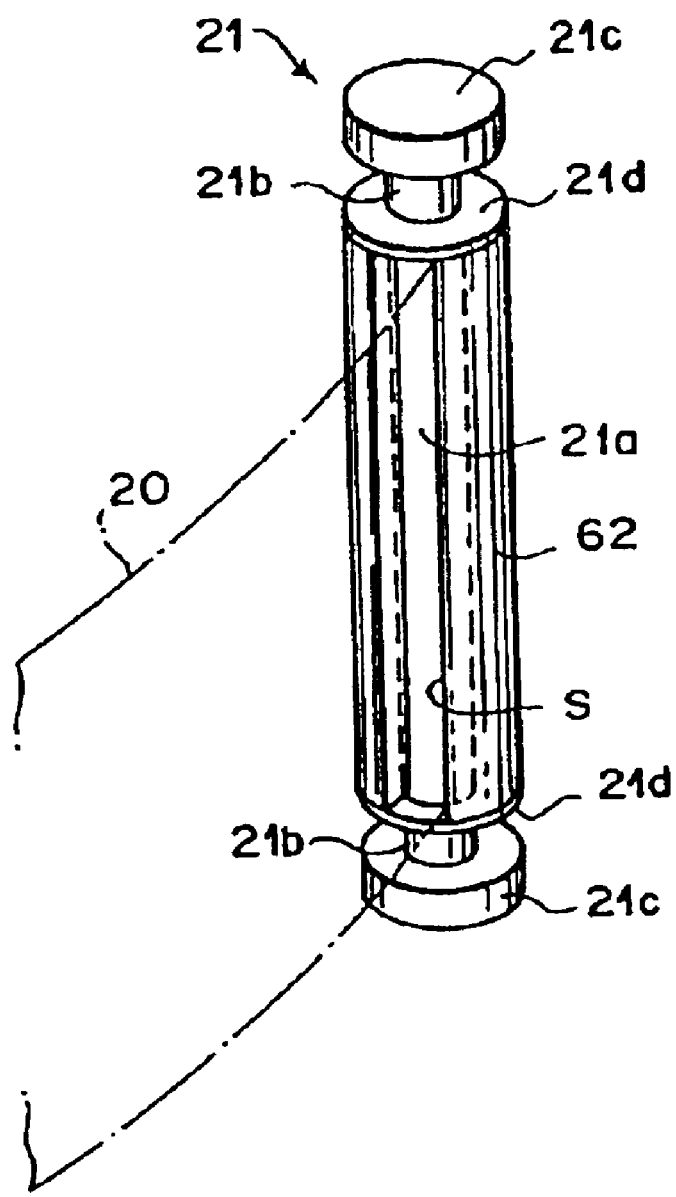
FIG. 4 is a perspective view of the leader pin shown in FIG. 3.

FIG. 2 is a fragmentary plan view showing the leader pin holding structure of the lower casing half 3, FIG. 3 is a cross-sectional view taken along line A—A in FIG. 2, FIG. 4 is a perspective view of the leader pin 21 shown in FIG. 3, FIG. 5A is an exploded perspective view of the leader pin 21, and FIG. 5B is a transverse cross-sectional view of the leader pin 21 fixed to the end of the magnetic tape 20.

As shown in FIG. 5A, the leader pin 21 comprises a pin body 61, which may be formed, for instance, by skiving from a metal rod and a clamp 62 which is formed by elastic synthetic resin. The pin body 61 comprises a central shaft portion 21a provided with a flange 21d in each end thereof, and the leading end of the magnetic tape 20 is clamped on the central shaft portion 21a by the clamp 62. The length of the central shaft portion 21a between the flanges 21d conforms to the width of the magnetic tape 20, ½ inches (12.7 mm).

The root of each flange 21d merging to the central shaft portion 21a is rounded into a shape conforming to the shape of the cutting tool. A pair of small diameter portions 21b are formed on opposite sides of the central shaft portion 21a and a pair of head portions 21c are formed on the outer sides of the respective small diameter portions 21b. The head portions 21c are substantially equal to the central shaft portion 21a in diameter. The tape drawing mechanism of the tape drive apparatus catches the leader pin 21 at the small diameter portions 21b.

The clamp 62 has a slit S which extends over the entire length of the clamp 62 in its axial direction and is C-shaped in cross-section. The clamp 62 is resiliently press-fitted on the central shaft portion 21a through the slit S with the leading end portion of the magnetic tape 20 pinched between the inner wall surface of the clamp 62 and the outer surface of the central shaft portion 21a, whereby the leading end portion of the magnetic tape 20 is fixed to the leader pin 4.

Figure 6:
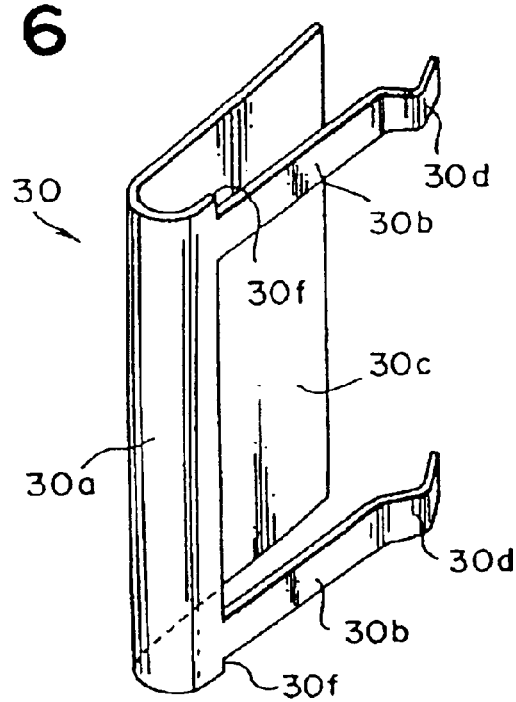
FIG. 6 is a perspective view of an example of the spring member.

As shown in FIGS. 2 and 3, the recesses 28 are respectively formed on the lower surface of the top wall 2a of the upper casing half 2 and the upper surface of the bottom wall 3a of the lower casing half 3 near the tape draw-out opening 26 of the cartridge casing 7. The leader pin 21 is removably held in the tape draw-out opening 26 by a spring member 30 formed by a plate spring as shown in FIG. 6 with the upper and lower head portions 21c of the leader pin 21 received in the recesses 28 and pressed against internal wall portions 28a of the recesses 28. As shown in FIG. 2, the internal wall portion 28a is equal to the outer peripheral surface of the head portion 21c of the leader pin 21 in curvature.

As shown in FIG. 6, the spring member 30 is like a hairpin in plan and comprises a semicylindrical base portion 30a extending in the vertical direction, upper and lower arm 30b extending in the horizontal direction in parallel to each other from one side of upper and lower ends of the base portion 30a, and a back plate portion 30c which extends from the other side of the base portion 30a. The spring member 30 is symmetrical about its horizontal axis. A pin holding portion 30d is formed on the free end portion of each of the upper and lower arms 30b. The pin holding portion 30d has a rear inclined surface and a front inclined surface and resiliently abuts against the outer peripheral surface of the head portion 21a of the leader pin 21 sideways. As the pin holding portion 30d abuts against the head portion 21a, the arm 30b is resiliently deformed and presses the head portion 21c against the vertical wall surface 28a of the recess 28 under its resiliency.

The outer edges of the arms 30b are cut to form steps 30f between the arms 30b and the base portion 30a so that the arms 30b are not brought into contact with the inner surface of the cartridge casing 7 when the leader pin 21 taken in out the cartridge casing 7 and the arms 30b are deflected. Upper and lower end portions of the base portion 30a and upper and lower end portions of the back plate portion 30c form a mounting portion for mounting the spring member 30 on the cartridge casing 7.

As shown in FIG. 2, a pair of bosses 35 and 36 are erected from the bottom wall 3a of the lower casing half 3 along a side wall 3b of the lower casing half 3, and lower end portions of the base portion 30a and the back plate portion 30c are fitted in narrow gaps between the bosses 35 and 36 and the side wall 3b of the lower casing half 3 and a lower end portion of the base portion 30a is fitted in the narrow gap formed between the boss 35 and the wall portion of the lower casing half 3.

That is, the spring member 30 is mounted on the lower casing half 3 with the lower end portion of the base portion 30a being fitted in the gap between the boss 35 and the side wall 3b and the gap behind the boss 35 deflecting the boss 35, and the front portion of the lower end portion of the back plate portion 30c being fitted in the gap between the boss 36 and the side wall 3b.

By forming the step 30f along the lower edge of the lower arm 30b between the lower arm 30b and the base portion 30 as shown in FIG. 6, a clearance is formed between the lower edge of the lower arm 30b and the upper surface of the bottom wall 3a of the lower casing half 3, and accordingly, the lower arm 30b is not brought into contact with the inner surface of the cartridge casing 7 when the lower arm 30b is deflected, whereby action of the lower arm 30b is stabilized and the lower arm 30b is prevented from scraping the bottom wall 3a of the lower casing half 3.

Though not shown, the upper portion of the spring member 30 is mounted on the upper casing half 2 by the similar structure as can be seen from FIG. 3. Also in the upper portion of the spring member 30, the upper arm 30b is not brought into contact with the inner surface of the cartridge casing 7 when the upper arm 30b is deflected, whereby action of the upper arm 30b is stabilized and the upper arm 30b is prevented from scraping the top wall 2a of the upper casing half 2. The spring member 30 is fixed to the cartridge casing 7 by fastening the upper and lower casing halves 2 and 3.

Figure 7:
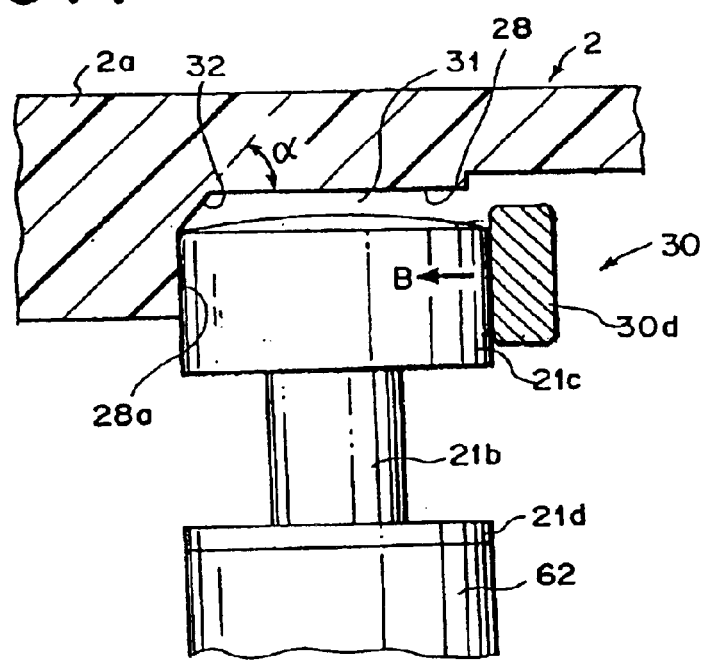
FIG. 7 is an enlarged cross-sectional view of a part of the upper casing half which is taken along the direction in which the spring member is urged in FIG. 2, and shows an embodiment of the leader pin locating structure in the magnetic tape cartridge.

The leader pin 21 is pressed against the wall surfaces 28a of the recesses 28 by the upper and lower arms 30b of the spring member 30 whose pin holding portions 30d are resiliently pressed against the upper and lower head portions 21c of the leader pin 21 sideways. At this time, when the lower end face of the lower head portion 21c of the leader pin is in contact with the upward surface of the recess 28 in the lower casing half 3, the small diameter portions 21b of the leader pin 21 are in the correct level with respect to the tape drawing mechanism of the tape drive apparatus. When the leader pin 21 is in the correct position, a clearance 31 is formed between the upper end face of the upper head portion 21c and the downward surface of the recess 28 in the upper casing half 2 as shown in FIG. 7. An inclined surface 32 facing obliquely downward is provided in an upper portion of the wall surface 28a opposed to the leader pin urging direction of the spring member 30 over the entire height of the clearance 31.

Accordingly, when the leader pin 21 is displaced upward from the correct position by drop impact or vibration during transportation, the edge of the upper head portion 21c comes to abut against the inclined surface 32. Since the upper head portion 21c is urged leftward as seen in FIG. 7 (downward toward right in FIG. 2 as shown by arrow B a force pushing downward the leader pin 21 acts on the leader pin 21 and the leader pin 21 is returned to the correct position where the lower end face of the lower head portion 21c of the leader pin is in contact with the upward surface of the recess 28 in the lower casing half 3. In this manner, the small diameter portions 21b of the leader pin 21 are kept in the correct level with respect to the tape drawing mechanism of the tape drive apparatus.

Figure 8:
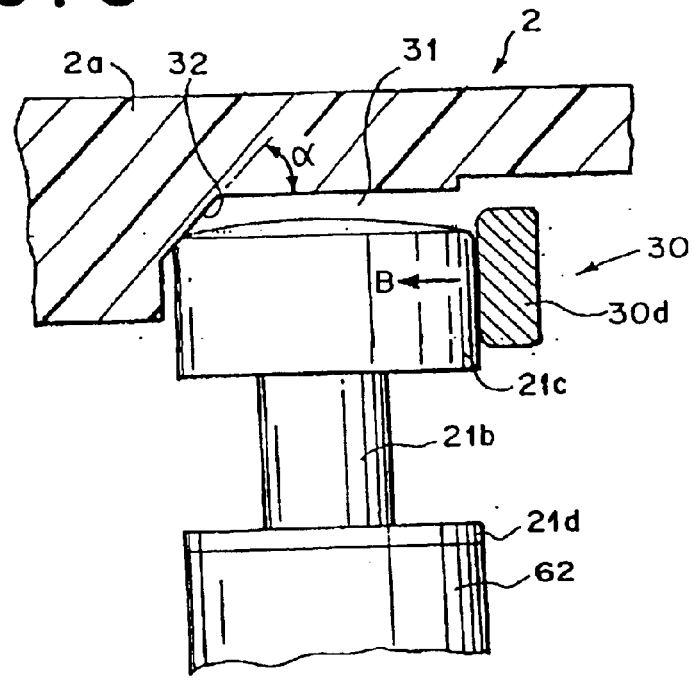
FIGS. 8 and 9 are fragmentary enlarged cross-sectional views similar to FIG. 7 but showing leader pin locating structures in the magnetic tape cartridge in accordance with other embodiments of the present invention.

The inclined surface 32 may extend downward beyond the lower end of the clearance 31 as shown in FIG. 8. In this case, a force pushing downward the leader pin 21 normally acts on the leader pin 21, whereby the leader pin 21 is prevented from moving upward due to drop impact or the like.

As the inclining angle $\alpha$ of the inclined surface 32 becomes larger, the downward urging force increases though sideways locating accuracy deteriorates, and as the inclining angle $\alpha$ of the inclined surface 32 becomes smaller, the downward urging force is reduced though sideways locating accuracy increases. Accordingly, $\alpha=45°$ is a turning point.

Figure 9:
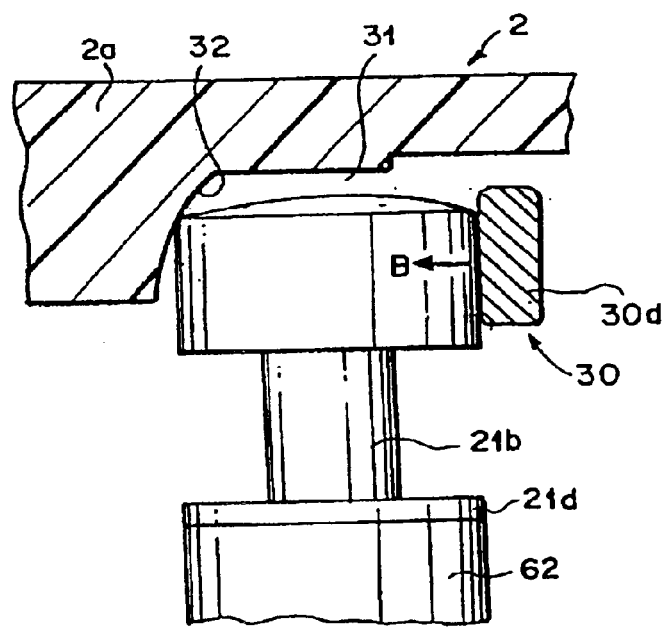
Figure 10:
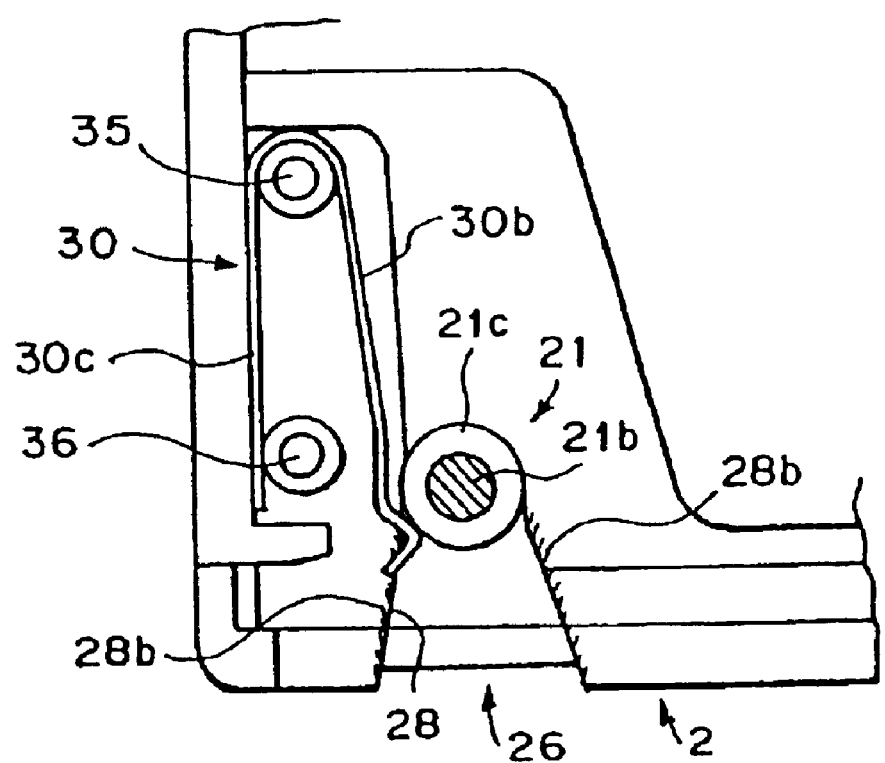
FIG. 10 is a fragmentary bottom view of the upper casing half of the cartridge casing showing a leader pin locating structure in accordance with still another embodiment of the present invention.

The inclined surface 32 may be curved or arcuated as shown in FIG. 9. Further, such an inclined surface may be formed on the side walls 28b of the inlet portion of the recess 28 in the upper casing half 2 as shown in FIG. 10. By virtue of the inclined surface, the leader pin 21 is pushed downward under counterforce to the leader pin insertion force of the member of the recording and reproducing apparatus, whereby the leader pin 21 can be confined downward more surely.

In the embodiments described above, an inclined surface 32 is provided on the side wall of the recess 28 formed in the lower surface of the top wall 2a of the upper casing half 2 opposed to the direction in which the spring member 30 urges the leader pin 21, and the inclined surface 32 in association with the spring member 30 confines downward the leader pin 21. In the embodiments shown in FIGS. 11 to 13, a guide surface 38A, 38B or 38C inclined downward in the direction of insertion of the leader pin 21 into the recess 28 in the upper casing half 2 is provided on the lower surface of the top wall 2a of the upper casing half 2 at the inlet portion of the recess 28. With this arrangement, when the leader pin 21 is returned to the recesses 28 by the tape drawing mechanism which catches the leader pin 21 at the small diameter portions 21b, the guide surface 38A, 38B or 38C guides the leader pin 21 to the correct position.

Figure 11:
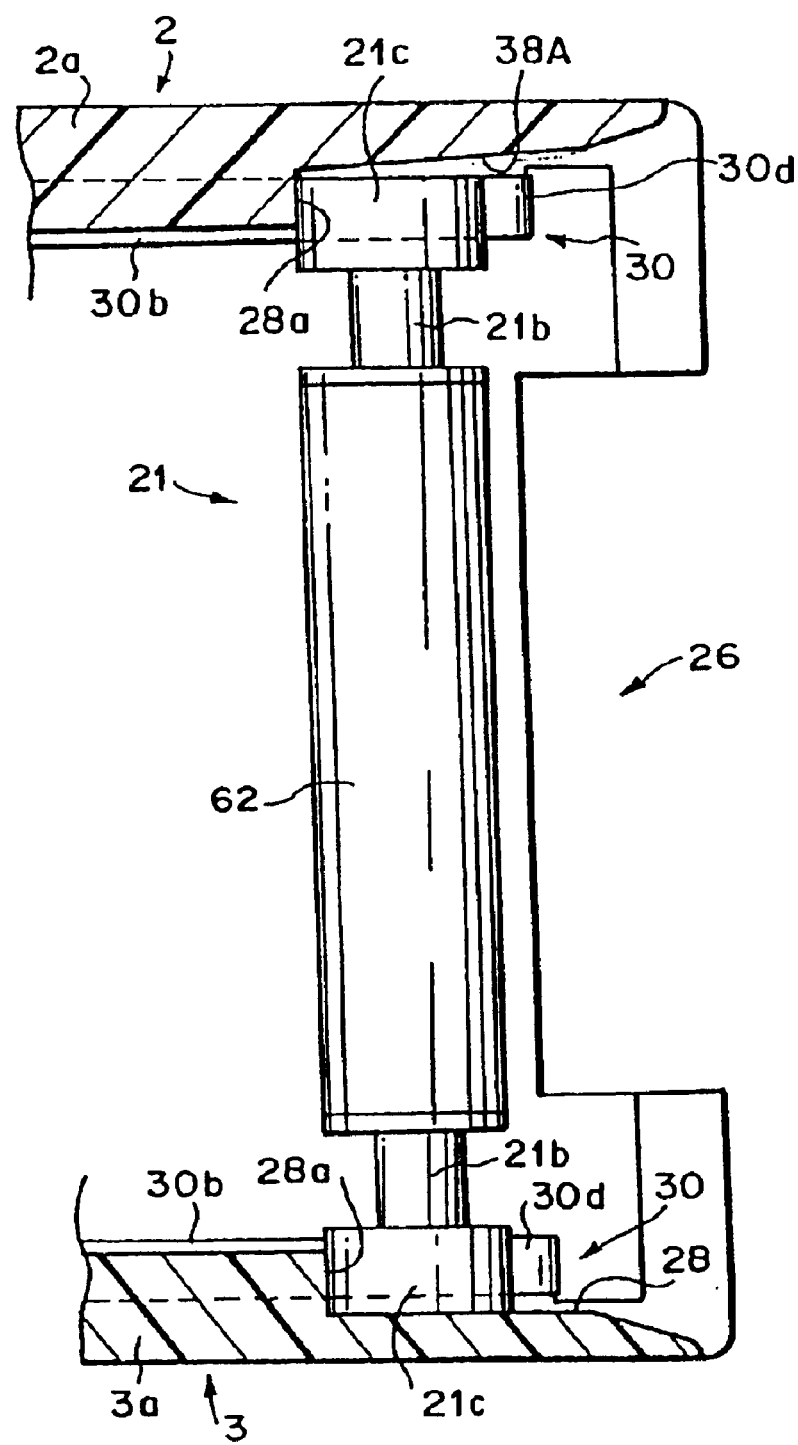
FIG. 11 is an enlarged fragmentary cross-sectional view showing the guide surface in a leader pin locating structure in accordance with still another embodiment of the present invention.
Figure 12:
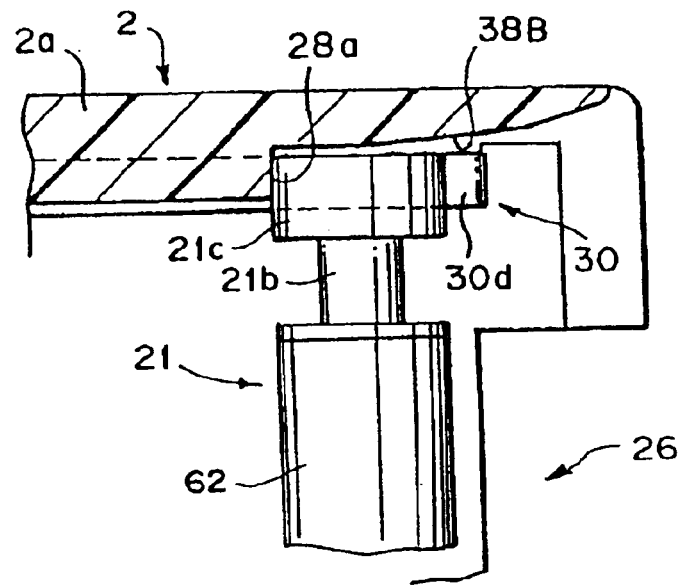
FIGS. 12 and 13 are views similar to FIG. 11 but showing the guide surface in leader pin locating structures in accordance with still other embodiments of the present invention.
Figure 13:
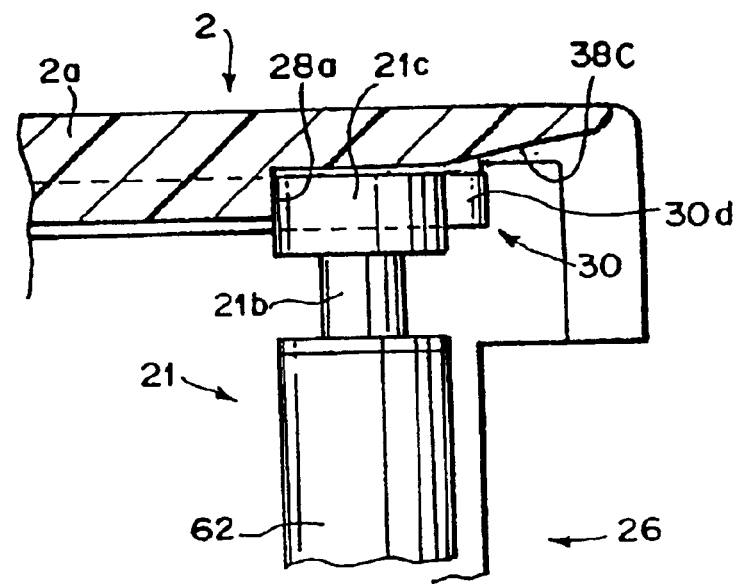

That is, in FIG. 11, the guide surface 38A extends from the edge of the tape draw-out opening 26 deep to the interior of the recess 28. In this case, even if the manufacturing accuracy of the upper and lower casing halves 2 and 3 are somewhat low, it can be absorbed. In FIG. 12, the guide surface 38B extends from the edge of the tape draw-out opening 26 to a position near the center of the upper head portion 21c of the leader pin 21. In this case, the leader pin guide performance and the leader pin holding performance are well matched. In FIG. 13, the guide surface 38C extends from the edge of the tape draw-out opening 26 to the upper head portion 21c of the leader pin 21. In this case, the leader pin holding performance is enhanced.

In the embodiment shown in FIG. 14, the pin holding portion 30d of the upper arm 30b of the spring member 30 pushes obliquely downward the upper head portion 21c of the leader pin 21. The oblique downward force B includes a horizontal component and a vertical component, and the horizontal component urges sideways the upper head portion 21c while the vertical component urges downward the upper head portion 21c, whereby the leader pin 21 is confined downward and is prevented from moving upward due to drop impact or the like.

In the embodiment shown in FIG. 15, the lower head portion 21c of the leader pin 21 is provided at its upper peripheral surface with an inclined surface 21e facing obliquely upward. The pin holding portion 30d of the lower arm 30b of the spring member 30 pushes obliquely downward the lower head portion 21c of the leader pin 21. As in the embodiment shown in FIG. 14, the oblique downward force generates a component which urges downward the leader pin 21, whereby the leader pin 21 is confined downward and is prevented from moving upward due to drop impact or the like.

Figure 16A:
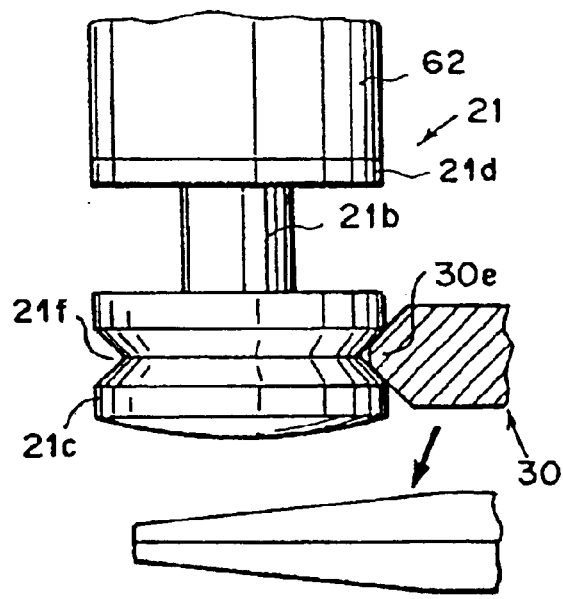
FIGS. 16A to 16D are enlarged fragmentary cross-sectional views showing leader pin locating structures in accordance with still other embodiments of the present invention.
Figure 16B:
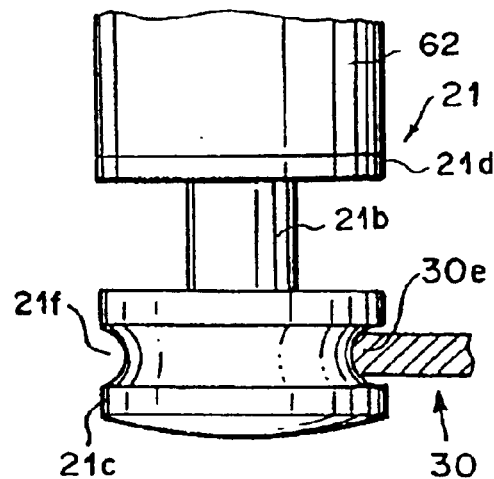
Figure 16C:
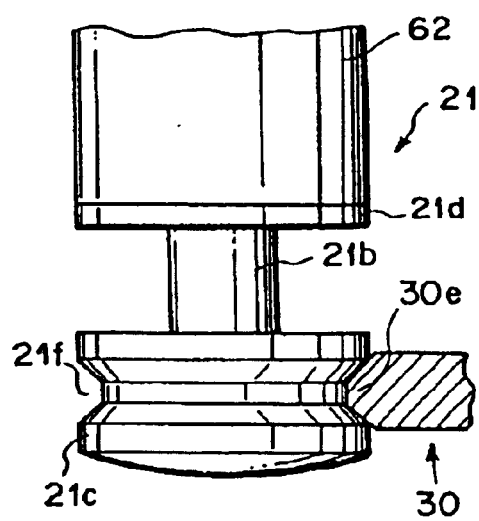

In the embodiments shown in FIGS. 16A to 16C, a groove 21f is formed on the outer peripheral surface of the head portion 21c of the leader pin 21, and an engagement portion 30e formed on the pin holding portion 30d of the lower arm 30b of the spring member 30 is in engagement with the groove 21f pressed against the grove 21f sideways, whereby the leader pin 21 is confined downward and is prevented from moving upward.

Figure 16D:
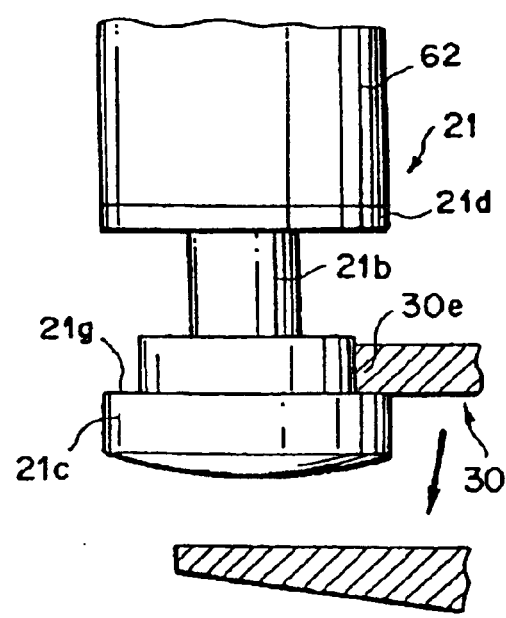

In the arrangement shown in FIG. 16D, a step 21g is formed by cutting an upper part of the head portion 21c of the leader pin 21, and an engagement portion 30e formed on the pin holding portion 30d of the lower arm 30b of the spring member 30 is in engagement with the groove 21f pressed against the grove 21f sideways so that the leader pin 21 is urged both sideways and downward. The lower surface of the engagement portion 30e is inclined in the direction of insertion of the leader pin 21 so that as the leader pin 21 is inserted deeper in the recess 28, the downward urging force is increased.

Figure 17:
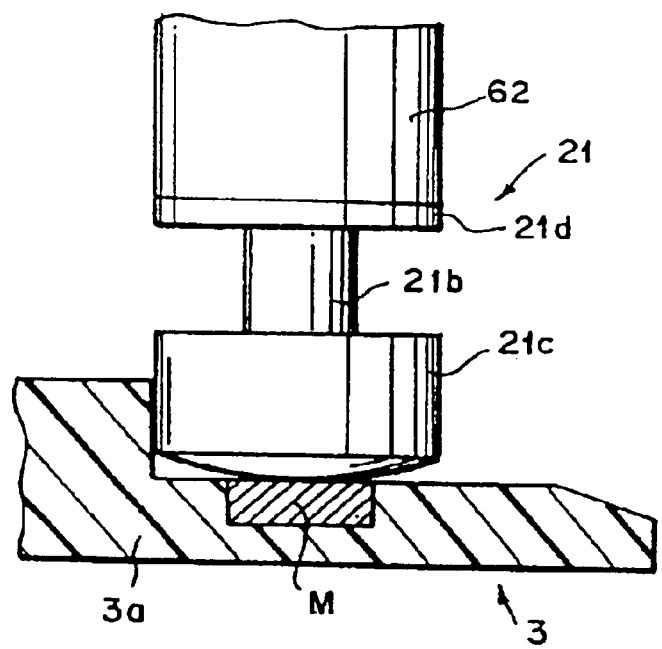
FIGS. 17 and 18 are enlarged fragmentary cross-sectional views showing leader pin locating structures in accordance with still other embodiments of the present invention.

In the embodiment shown in FIG. 17, at least the lower head portion 21c of the leader pin 21 is formed of a magnetic material and a permanent magnet M is embedded in the bottom wall 3a of the lower casing half 3 in a position where the lower end face of the lower head portion 21c is brought into contact with the bottom wall 3a. The leader pin 21 is attracted downward by the permanent magnet M, whereby the leader pin 21 is confined downward and is prevented from moving upward due to drop impact or the like.

Figure 18:
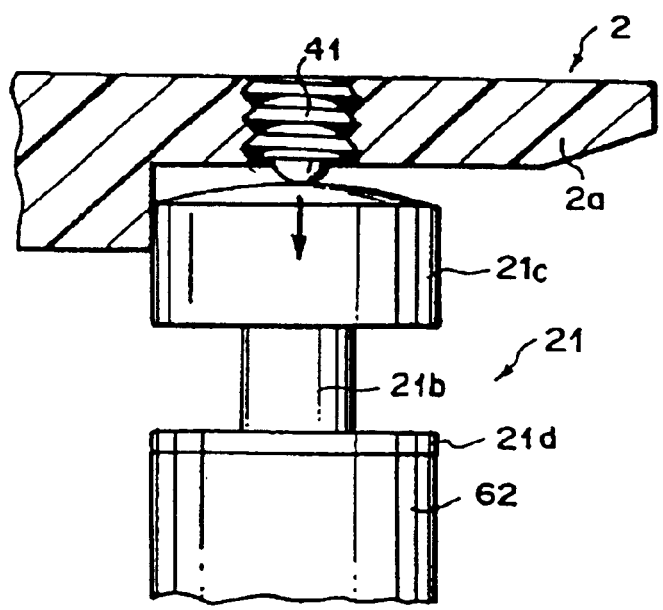

As shown in FIG. 18, the leader pin 21 can be confined downward by mounting a ball plunger 41 in the top wall 2a of the upper casing half 2 of the cartridge casing 7 in a position opposed to the upper end face of the upper head portion 21c.

Figure 19:
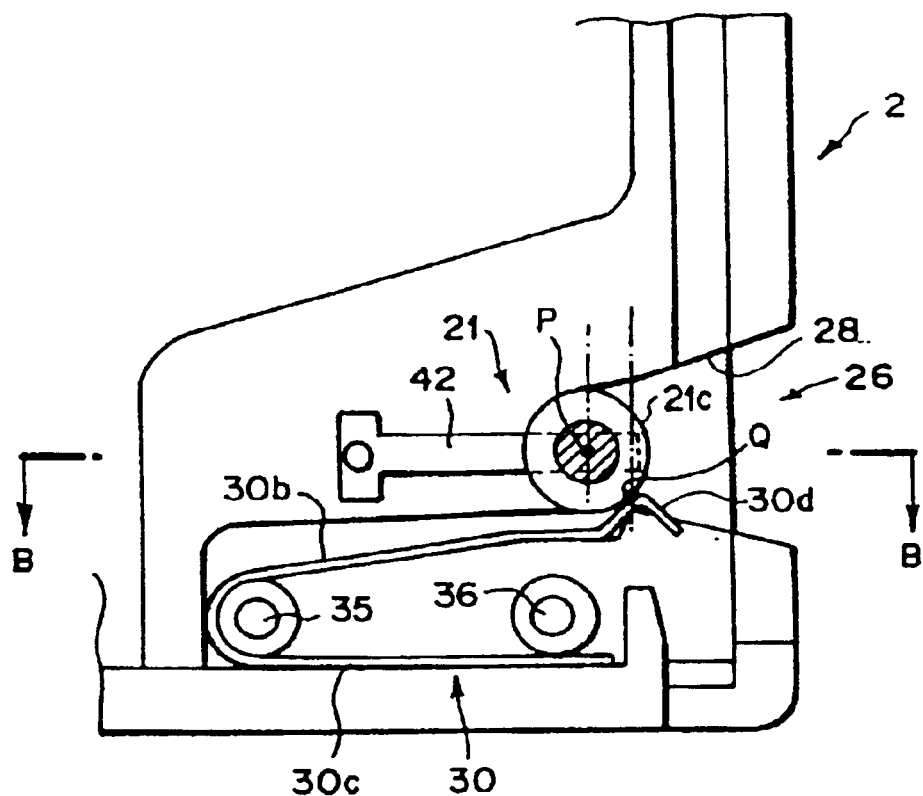
FIG. 19 is a fragmentary bottom view of the upper casing half of the cartridge casing showing a leader pin locating structure in accordance with still another embodiment of the present invention.
Figure 20:
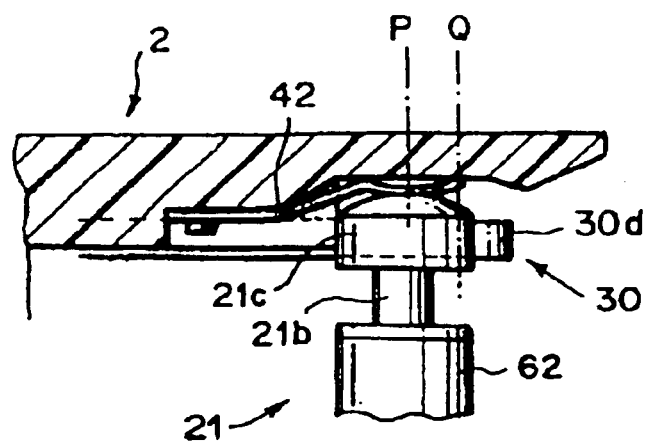
FIG. 20 is a cross-sectional view taken along line B—B in FIG. 19.

Further as shown in FIGS. 19 and 20, the leader pin 21 can be confined downward by providing a second spring member 42 formed of a plate spring on the top wall 2a of the upper casing half 2 to resiliently abut against the upper end face of the upper head portion 21c of the leader pin 21 and urge downward the leader pin 21.

In this case, it is preferred that the maximum load point Q on the upper head portion 21c of the leader pin 21 by the first spring member 30 which urges sideways the leader pin 21 and the maximum load point P on the upper head portion 21c of the leader pin 21 by the second spring member 42 which urges downward the leader pin 21 be displaced from each other in the direction of insertion of the leader pin 21. With this arrangement, the leader pin 21 can be confined downward by the second spring member 42. At the same time, since the maximum load point on the leader pin 21 by the first spring member 30 and that by the second spring member 42 are displaced from each other in the direction of insertion of the leader pin 21, the leader pin 21 can be prevented from being inserted and held in an inclined state due to imbalance of transverse urging forces acting on the leader pin 21 at its upper portion and lower portion.

Figure 21:
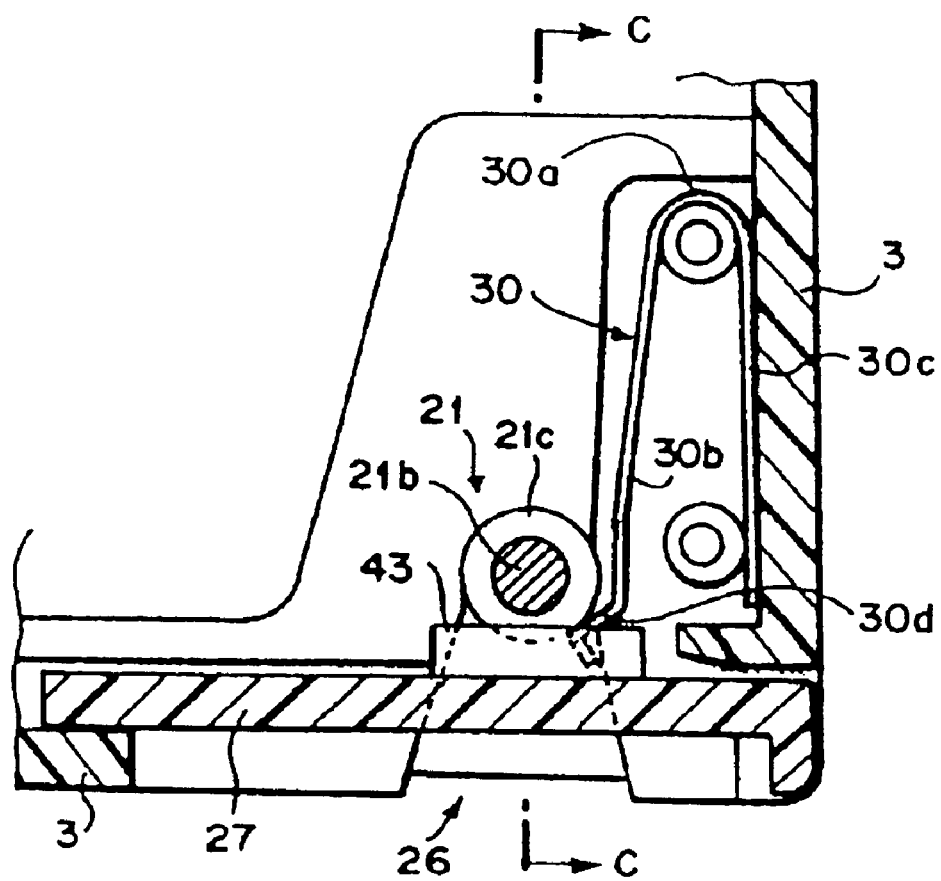
FIG. 21 is an enlarged fragmentary plan view partly in cross-section showing a leader pin locating structure in accordance with still another embodiment of the present invention.
Figure 22:
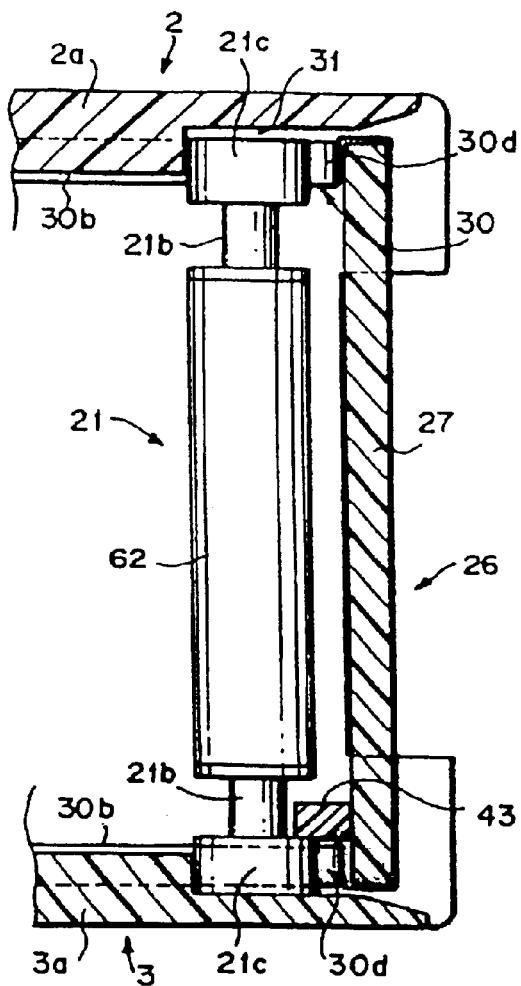
FIG. 22 is a cross-sectional view taken along line C—C in FIG. 21.

In the embodiment shown in FIGS. 21 and 22, the slide door 27 for opening and closing the tape draw-out opening 26 is provided on the back side thereof with a rib 43 which is brought into abutment against the upper surface of the lower head portion 21c of the leader pin 21 and presses downward the leader pin 21.

Figure 23:
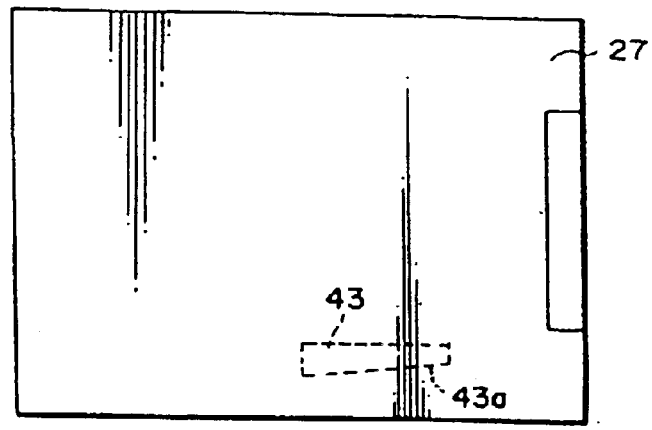
FIG. 23 is a front view of the slide door shown in FIG. 22.

As shown in FIG. 23, the lower surface 43a of the rib 43 is inclined and presses downward the upper surface of the lower head portion 21c in response to movement of the slide door 27 to the closing position, thereby confining downward the leader pin 21.

Though, in the description above, a clearance 31 exists between the downward surface of the recess 28 of the upper casing half 2 of the cartridge casing 7 and the upper end face of the upper head portion 21c of the leader pin 21, the present invention can also be applied to the magnetic tape cartridges where such clearance does not exist.

When the leader pin 21 is taken out from the cartridge casing 7 by the tape drawing mechanism of the tape drive apparatus or when the leader pin 21 is returned to the cartridge casing 7 by the tape drawing mechanism, a part of the spring mechanism 30 is deformed. Especially when the spring member 30 is of a plate spring, the edge of the deformed part can scratch the inner surface of the cartridge casing 7 to increase frictional resistance. The increased frictional resistance changes load on the spring member 30 and makes instable the action of the spring member 30. At the worst, the spring member 30 can be caught by the inner surface of the cartridge casing 7, and the leader pin 21 can be disabled from being taken out from and received in the cartridge casing 7.

Further, when the edge of the spring member 30 of metal scratches the inner surface of the cartridge casing 7 which is of plastic every time the leader pin 21 is taken in and out the cartridge casing 7 by the tape draw-out mechanism of the tape drive apparatus, the inner surface of the cartridge casing 7 is scraped and shavings can adhere to the surface of the magnetic tape 20 to cause drop out.

Accordingly, in the spring member 30 shown in FIG. 6, the edges of the arms 30b are cut to form the steps 30f between the arms 30b and the base portion 30 so that the arms 30b are not brought into contact with the inner surface of the cartridge casing 7 when the arms 30b are deflected, whereby action of the arms 30b is stabilized and the arms 30b are prevented from scraping the inner surface of the cartridge casing 7.

Figure 24:
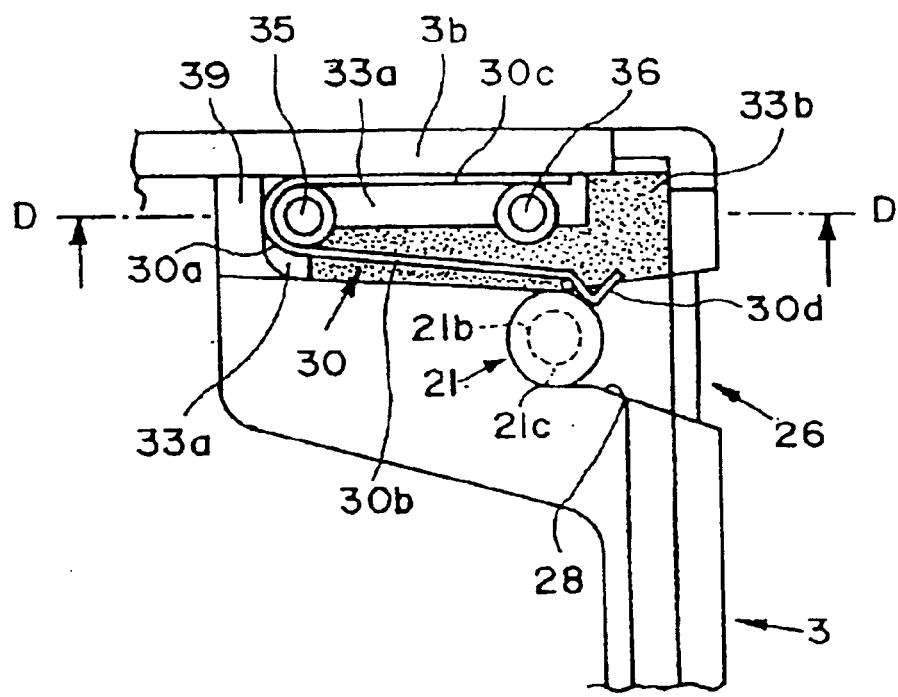
FIG. 24 is a fragmentary plan view showing the spring member mounting structure in the lower casing half of the cartridge casing.
Figure 25:
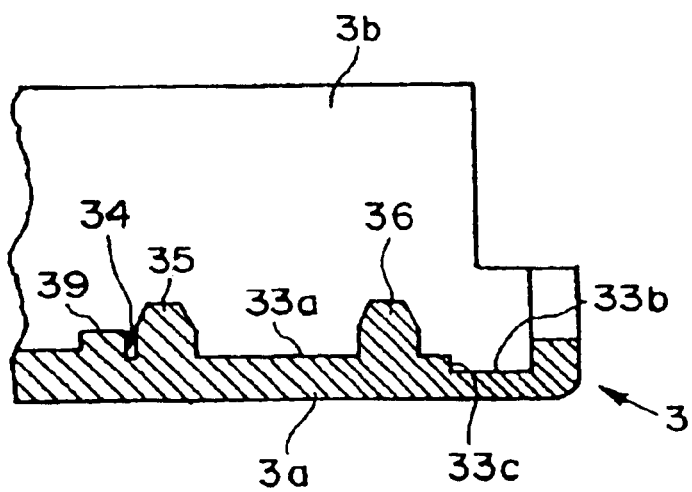
FIG. 25 is a cross-sectional view taken along line D—D in FIG. 24.
Figure 26:
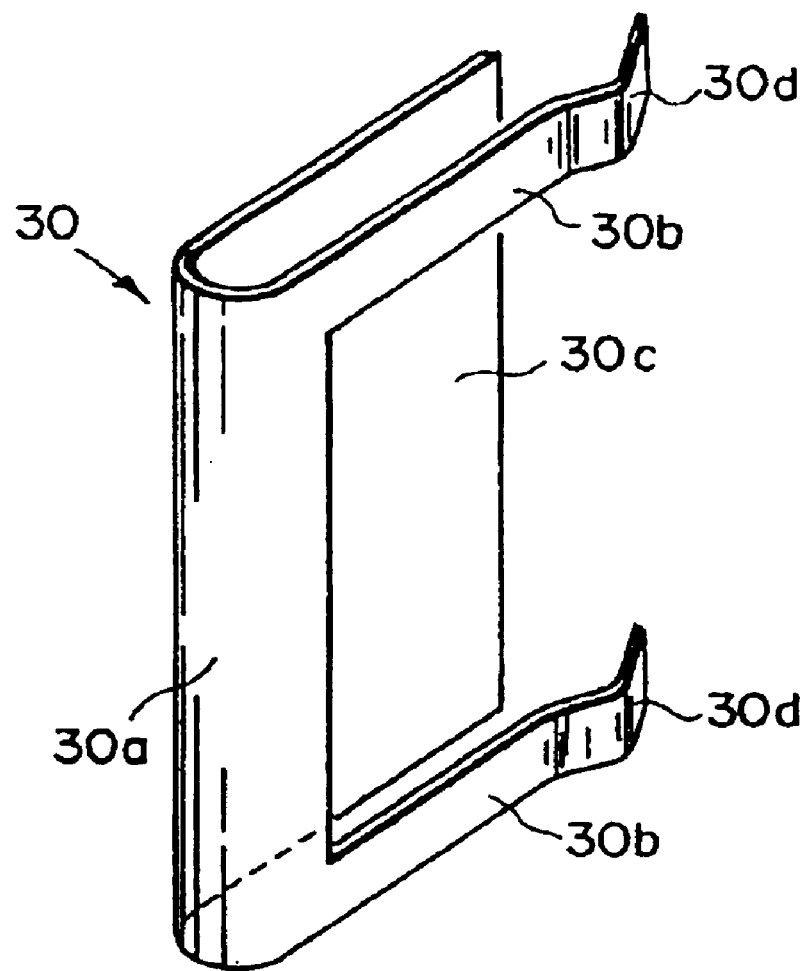
FIG. 26 is a perspective view showing the spring member shown in FIG. 24.

The effect can be obtained also by an arrangement shown in FIGS. 24 to 26. FIG. 24 is a fragmentary plan view showing the spring member mounting structure in the lower casing half 3. FIG. 25 is a cross-sectional view taken along line D—D in FIG. 24, and FIG. 26 is a perspective view showing the spring member shown in FIG. 24.

The spring member 30 shown in FIG. 26 comprises, like the spring member 30 shown in FIG. 6, a semicylindrical base portion 30a extending in the vertical direction, upper and lower arm 30b extending in the horizontal direction in parallel to each other from one side of upper and lower ends of the base portion 30a, and a back plate portion 30c which extends from the other side of the base portion 30a. The spring member 30 is like a hairpin in plan. A pin holding portion 30d is formed on the free end portion of each of the upper and lower arms 30b. The pin holding portion 30d has a rear inclined surface and a front inclined surface and resiliently abuts against the outer peripheral surface of the head portion 21a of the leader pin 21 sideways. As the pin holding portion 30d abuts against the head portion 21a, the arm 30b is resiliently deformed and presses the head portion 21c against the vertical wall surface 28a of the recess 28 under its resiliency.

The upper edges of the base portion 30a and the back plate portion 30c and the upper edge of the upper arm 30b are flush with each other and the lower edges of the base portion 30a and the back plate portion 30c and the lower edge of the lower arm 30b are flush with each other. Upper and lower end portions of the base portion 30a and upper and lower end portions of the back plate portion 30c form a mounting portion for mounting the spring member 30 on the cartridge casing 7.

As shown in FIGS. 24 and 25, a pair of bosses 35 and 36 are erected from the bottom wall 3a of the lower casing half 3 along a side wall 3b of the lower casing half 3, and lower end portions of the base portion 30a and the back plate portion 30c are fitted in narrow gaps between the bosses 35 and 36 and the side wall 3b of the lower casing half 3. Further, on the side of the boss 35 remote from the boss 36, a projection 39 is formed with a narrow gap 34 (FIG. 25) formed therebetween. A lower end portion of the base portion 30a is fitted in the narrow gap 34.

That is, the spring member 30 is mounted on the lower casing half 3 with the lower end portion of the base portion 30a being fitted in the gap between the boss 35 and the side wall 3b and the gap 34 between the boss 35 and the projection 39, and the front portion of the lower end portion of the back plate portion 30c being fitted in the gap between the boss 36 and the side wall 3b as shown in FIG. 24.

As shown in FIG. 25, a shoulder 33c is formed between the region 33a of the upward surface of the bottom wall 3a of the lower casing half 3 which supports the lower edges of the base portion 30a and the back plate portion 30c of the spring member 30 and the region 33b (the dotted region in FIG. 24) over which the lower edge of the lower arm 30b of the spring member 30 is slid, whereby the latter is recessed with respect to the former.

Accordingly, a clearance is formed between the lower edge of the lower arm 30b and region 33b and the lower arm 30b is not brought into contact with the upward surface of the bottom wall 3a of the lower casing half 3 when the arm 30b is deflected, whereby action of the lower arm 30b is stabilized and the arm 30b is prevented from scraping the upward surface of the lower casing half 3.

Though not shown, the upper portion of the spring member 30 is mounted on the upper casing half 2 by the similar structure. Also in the upper portion of the spring member 30, the upper arm 30b is not brought into contact with the downward surface of the top wall 2a of the upper casing half 2 when the upper arm 30b is deflected, whereby action of the upper arm 30b is stabilized and the upper arm 30b is prevented from scraping the top wall 2a of the upper casing half 2.

In the arrangement described above, the spring member 30 can be incorporated in the cartridge casing 7 by simply fastening the upper and lower casing halves 2 and 3. Further since the both ends of the leader pin 21 can be held by a single spring member 30, the number of parts can be reduced and the magnetic tape cartridge can be manufactured at lower cost.

The upper and lower arms 30b may be integrated into a single spring member 30 or may be separate from each other.

Figure 27:
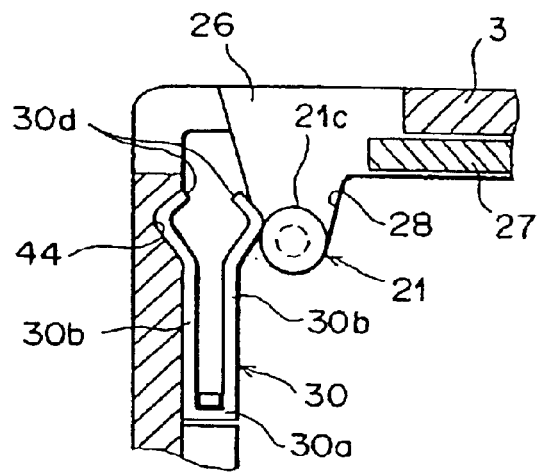
FIG. 27 is a fragmentary plan view partly in cross-section showing a spring member mounting structure in accordance with still another embodiment of the present invention.
Figure 28:
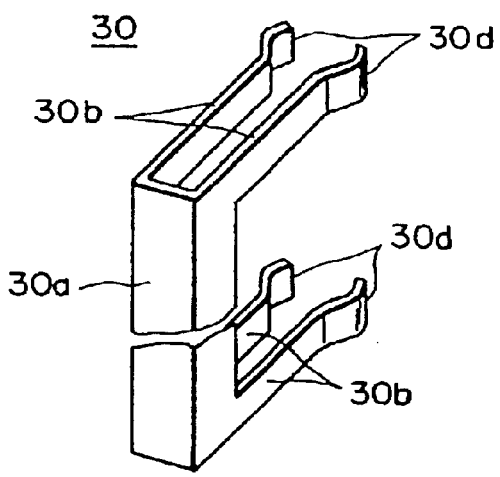
FIG. 28 is a perspective view showing the spring member shown in FIG. 27.

The spring member 30 in accordance with another embodiment of the present invention shown in FIGS. 27 and 28 is basically the same as that shown in FIG. 26 except that the spring member 30 shown in FIGS. 27 and 28 is symmetrical not about the horizontal axis but also about the vertical axis.

That is, in the embodiment shown in FIGS. 27 and 28, upper and lower arms 30b and upper and lower holding portions 30d which are the same as those shown in FIG. 4 in shape are provided in place of the back plate portion 30c. The upper and lower end portions of the base portion 30a and the upper and lower arms 30b form a mounting portion of the spring member 30 on the cartridge casing 7.

The upper and lower holding portions 30d which are not brought into contact with the leader pin 21 are received in recesses 44 formed in the upper and lower casing halves 2 and 3.

In this embodiment, the spring member 30 may be incorporated in the cartridge casing 1 in either of two directions and incorporation of the spring member is further simplified. The spring member of this embodiment is equivalent to the embodiment shown in FIG. 26 in other functions and that the regions 33b opposed to the movable arms 30b of the upper and lower casing halves 2 and 3 are recessed with respect to the regions 33a opposed to the fixed parts is the same as in the arrangement shown in FIGS. 24 and 25.

Figure 29:
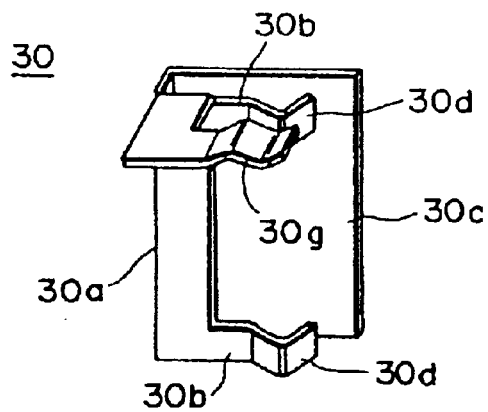
FIG. 29 is a perspective view showing the spring member in accordance with another embodiment of the present invention.

In a still another arrangement of the spring member 30 shown in FIG. 29, the spring member 30 is basically the same as that shown in FIG. 26 except that the spring member 30 is further provided with a pressing portion 30g in addition to the upper holding portion 30d.

That is, by the upper holding portion 30d, a pressing portion 30g extends from the upper edge of the upper arm 30b to extend in parallel to the arm 30b. The pressing portion 30g is brought into abutment against the upper end face of the upper flange 21c of the leader pin 21 to urge downward the leader pin 21 in the axial direction of the leader pin 21.

More particularly, the pressing portion 30g is formed on an L-shaped portion which laterally extends from the upper edge of the upper arm 30b and then bent forward to extend in parallel to the arm 30b.

In this arrangement, the pin holding portions 30d hold the leader pin 21 in the recesses 28 and the pressing portion 30g pushes downward the leader pin 21 in the vertical direction, thereby more precisely positioning the leader pin 21 in the cartridge casing 7.

Figure 30:
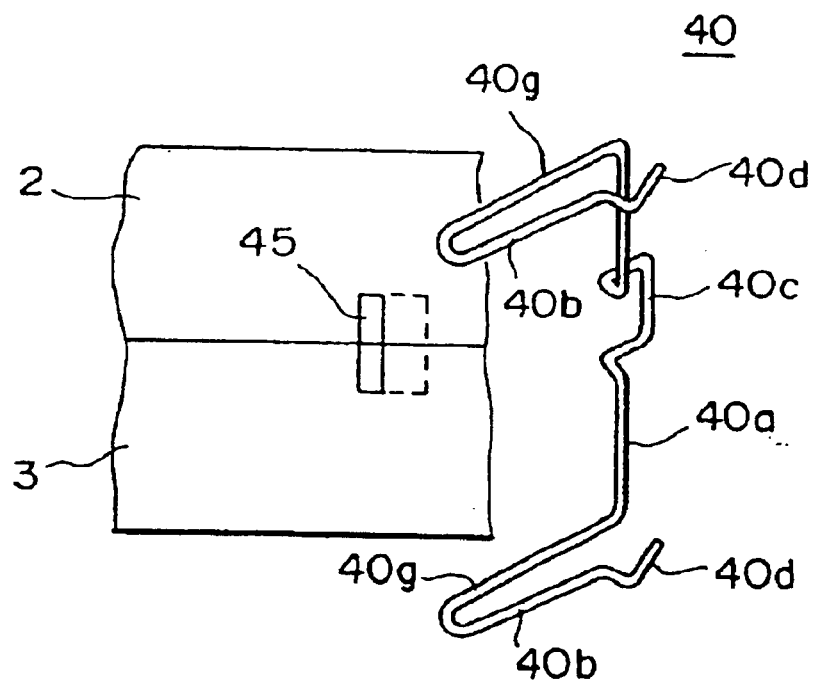
FIG. 30 is a perspective view showing the spring member in accordance with still another embodiment of the present invention.
Figure 31:
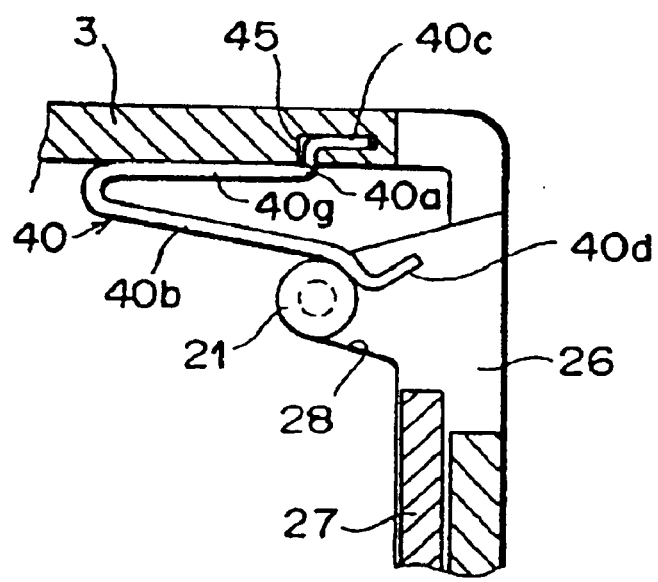
FIG. 31 is a fragmentary plan view partly in cross-section showing a spring member mounting structure for the spring member shown in FIG. 30.

In the arrangement shown in FIGS. 30 and 31, the spring member 40 is formed by a wire spring and comprises a vertical base portion 40a, upper and lower arms 40g which extend rearward from upper and lower ends of the base portion 40a and are sharply bent forward like a hair pin to form upper and lower movable arms 40b and upper and lower pin holding portions 40d which are formed on the free end portions of the upper and lower movable arms 40b. The pin holding portion 40d has a rear inclined portion and a front inclined portion and is shaped like a mountain. As the pin holding portion 40d abuts against the head portion 21a, the movable arm 40b is resiliently deformed and presses the head portion 21c in the recess 28 under its resiliency. The upper and lower arms 40g are fixed to the cartridge casing 7.

A mounting portion 40c is formed in the middle portion of the base portion 40a bent in the direction opposite to the pin holding portions 40d. The mounting portion 40c is inserted into an L-shaped groove 45 formed in the upper and lower casing halves 2 and 3 which open in the inner surfaces of the upper and lower casing halves 2 and 3 and in the mating surfaces of the same.

When incorporating the spring member 40, the spring member 40 is first placed on one of the casing halves 2 and 3 with the mounting portion 40c partly inserted into the groove 34 in the first casing half and then the other (second) casing half is superposed on the casing half so that the part of the mounting portion 40 projecting outside the groove 34 of the first casing half is inserted into the groove 34 of the second casing half and the fixed arms 40g abut against the inner surface of the upper and lower casing halves 2 and 3. Then the upper and lower casing halves 2 and 3 are fastened together. Also in this arrangement, since the upper and lower movable arms 40b are connected, incorporation of the spring member 40 is facilitated. The spring member of this embodiment is equivalent to the embodiment shown in FIG. 26 in other functions and that the regions 33b opposed to the movable arms 40b of the upper and lower casing halves 2 and 3 are recessed with respect to the regions 33a opposed to the fixed arms 40g is the same as in the arrangement shown in FIGS. 24 and 25.

Figure 32:
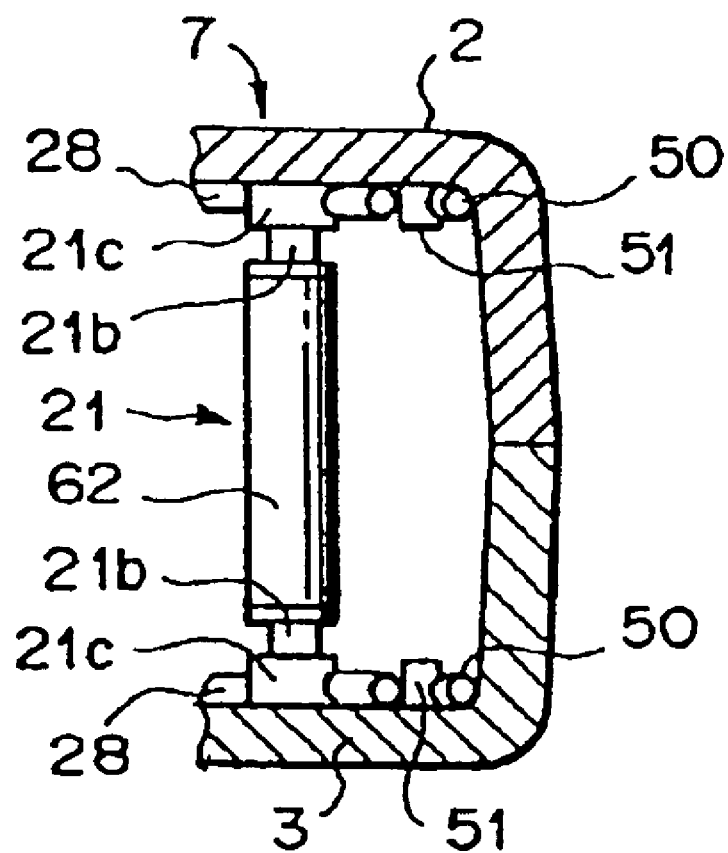
FIG. 32 is a fragmentary side view partly in cross-section showing a spring member mounting structure for another spring member.
Figure 33:
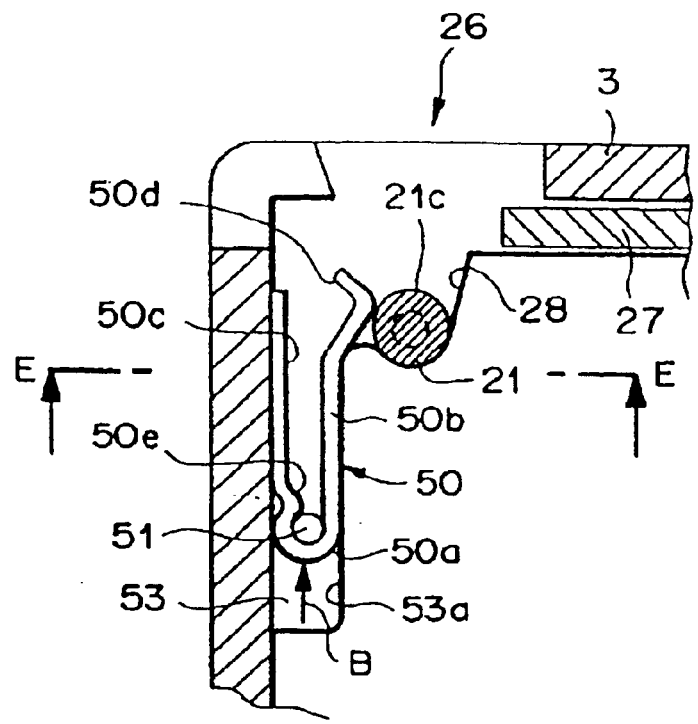
FIG. 33 is a transverse cross-sectional view of FIG. 32.
Figure 34:
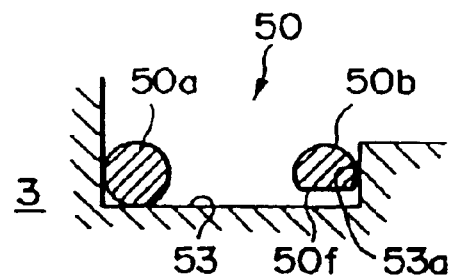
FIG. 34 is a cross-sectional view taken along line E—E in FIG. 33, and FIGS. 35 to 40 are fragmentary perspective views showing various positions of the gates for the clamp member.

In the spring member mounting structure shown in FIGS. 32 to 34, a pair of separate spring members 50 formed by a line spring are used and at least one of the spring members 50, for instance, the spring member 50 in the lower casing half 3 is provided with a cutaway portion 50f not to be brought into contact with the inner surface of the lower casing half 3 as shown in FIG. 34, which is an enlarged cross-sectional view taken along line E—E in FIG. 33.

That is, as shown in FIG. 33, the spring member 50 is like a hairpin and comprises a pin holding arm 50 and a mounting arm 50c extending substantially in parallel to each other from opposite sides of a bight portion 50a. A pin holding portion which is brought into abutment against the outer peripheral surface of the head portion 21c of the leader pin 21 to hold the head portion 21c in the recess 28 is provided on the end of the arm 50b, and the mounting arm 50c is substantially straight. The bight portion 50a has an inner diameter substantially equal to the outer diameter of a support pin 51 to be described later. A projection-like retainer portion 50e is provided from the bight portion 50a to the mounting arm 50c. The retainer portion 50e is formed by extending the bight portion 50a so that the bight portion 50a wraps the support pin 51 through a larger angle. The retainer portion 50e may be provided at the root of the pin holding arm 50b.

Each of the upper and lower casing halves 2 and 3 is provided with a groove 53 into which the spring member 50 is inserted. The support pin 51 is erected in the groove 53, and the bight portion 50a is fixed by press-fitting it into the gap between the support pin 51 and the inner surface of the casing half and between the support pin 51 and side wall surface 53a of the groove 53.

The groove 53 is connected to the recess 28 to facilitate mounting the spring member 50 in the groove 53 and the support pin 51 is erected at the deep interior of the groove 53. When the spring member 50 is mounted, the spring member 50 is once inserted into the groove 53 so that the bight portion 50a is positioned behind the support pin 51, and then the spring member 50 is forced in the direction of arrow B. When the retainer portion 50e is forced beyond the support pin 51, the support pin 51 is press-fitted in the bight portion 50a deforming the retainer portion 50e, whereby the spring member 50 is firmly fixed to the support pin 51.

In this arrangement, since the arm 50b is provided with the cutaway portion 50f as shown in FIG. 34, the arm 50b cannot be brought into contact with the upward surface of the lower casing half 3 even if it is deflected, whereby action of the arm 50b is stabilized and the arm 50b is prevented from scraping the upward surface of the lower casing half 3.

Material of the clamp 62 (FIG. 5A) for resiliently clamping the leading end of the magnetic tape 20 on the central shaft portion 21a will be described, hereinbelow.

When the resilient clamp 62 is formed of synthetic resin, the clamp 62 is normally under stress in the direction in which the clamp 62 is press-fitted on the central shaft portion 21a. Accordingly, there is a problem that when the magnetic tape cartridge is stored or used at an elevated temperature or in a high-temperature high-humidity atmosphere, the tape clamping force deteriorates due to creep (permanent deformation generated when subjected to constant stress within limit of elasticity for a long time) and stress relaxation (a phenomenon that the stress necessary to generate predetermined strain is gradually reduced with time).

The clamp 62 is formed of synthetic resin which is 130° C. or higher in deflection temperature under load or synthetic resin which is 220° C. or higher in melting temperature or softening temperature.

It is preferred that the synthetic resin be reinforced with glass fiber, carbon fiber, aramid fiber or the like. The synthetic resin reinforced with such fiber is higher in deflection temperature under load than resin not reinforced. Accordingly, even synthetic resin which is lower than 130° C. in deflection temperature under load can be used for forming the clamp 62 by reinforcing with fiber.

The melting temperature (Tm) for crystalline resin is clear but the melting point for non-crystalline resin is not clear Accordingly, "the softening temperature" is used as an index for non-crystalline resin. Preferred materials for clamp 62 are listed in the following table 1.

TABLE 1

| No. | resin | Tm (° C.) | deflection temperature (° C.) under load 18.6 kg/cm² | |
|---|---|---|---|---|
| | | | non-reinforced | GF 30% |
| 1 | polyphenylene sulfide (PPS) | 285 | | >260 |
| 2 | thermoplastic polyimide (TPI) | 388 | 238 | 248 |
| 3 | polyether-ether ketone (PEEK) | 334 | 152 | 300 |

TABLE 1-continued

| No. | resin | Tm (° C.) | deflection temperature (° C.) under load 18.6 kg/cm² | |
|---|---|---|---|---|
| | | | non-reinforced | GF 30% |
| 4 | polyether-nitrile (PEN) | 340 | 165 | 330 |
| 5 | polysulfone (PSF) | | 174 | 181 |
| 6 | polyether-sulfone (PES) | | 203 | 216 |
| 7 | polyether imide (PEI) | | 200 | 210 |
| 8 | polyamide-imide (PAI) | | 278 | 282 |
| 9 | liquid-crystal polymer (LCP I) | | | 240–340 |
| 10 | liquid-crystal polymer (LCP II) | | | 230–260 |
| 11 | polybutylene terephthalate (PBT) | | 78–80 | 213 |
| 12 | polycarbonate (PC) | | 130–136 | 145–150 |

In table 1, "non-reinforced" means resin grade added with no reinforcing fiber, and "GF 30%" means resin grade reinforced with 30% by weight of glass fiber.

When the clamp 62 is formed by resin injection molding, there is fear that the gate mark adversely affects function of the leader pin 21. Though the resin injection molding can form products of a complicated shape at high efficiency with a high dimensional accuracy and is very useful, the injection molding is disadvantageous in that a gate mark projects beyond the surface of the product, which causes a problem in dimensional accuracy.

Since it is necessary to press-fitting the clamp 62 on the central shaft portion 21a of the pin body 61 not to be movable in the axial direction of the central shaft portion 21a in order to locate the magnetic tape 20 in the direction of width of the tape 20. Since the central shaft portion 21a is provided with the flanges 21d at its opposite ends, when a gate mark is on an end face of the clamp 62, the gate mark (a projection) interferes with the flange 21d to cause unsatisfactory press-fitting of the clamp 62 on the central shaft portion 21a. However, if the clamp 62 is shortened to form a clearance between the clamp 62 and the flange 21d, the clamp 62 can move in the axial direction of the shaft portion 21a after press-fitted thereon, which results in movement of the magnetic tape 20 in the direction of its width and can adversely affect recording and reproduction. Accordingly, it is not preferred that a gate mark is on an end face of the clamp 62. Further, when a gate mark is on the inner surface of the clamp 62, the gate mark can damage the magnetic tape 20. Accordingly, it is not preferred that a gate mark is on the inner surface of the clamp 62. Further, when a gate mark is on the outer peripheral surface of the clamp 62, the gate mark can interfere with a component of the tape drive apparatus and adversely affect running the magnetic tape along a predetermined path. Accordingly, it is not preferred that a gate mark is on the outer surface of the clamp 62.

Positions of the gate where the gate mark will not deteriorates the function of the leader pin 21 will be described, hereinbelow.

The clamp 62 is formed by resin molding and is substantially equal to the central shaft portion 21a in length as shown in FIG. 5A. The clamp 62 has a slit S which extends over the entire length of the clamp 62 in its axial direction and is C-shaped in cross-section. The width of the slit S is narrower than the outer diameter of the central shaft portion 21a and the clamp 62 is press-fitted on the central shaft portion 21a through the slit S by resiliently enlarging the slit S. When the clamp 62 is press-fitted on the central shaft portion 21a with the leading end portion of the magnetic tape 20 pinched between the inner wall surface of the clamp 62 and the outer surface of the central shaft portion 21a, the inner surface 62b of the clamp 62 is brought into a close contact with the outer surface of the central shaft portion 21a and the outer surface 62a of the clamp 62 comes to be flush with the outer surface of the flanges 21d (or the head portions 21c).

In the clamp 62 shown in FIG. 35, a recess 63 is formed on at least one of the end faces 62c and a gate is formed so that a gate mark is left in the recess 63.

In this case, as the gate system for the injection mold, a pinpoint gate formed in the axial direction of the clamp 62 opposed to the recess 63 is suitable. The depth of the recess 63 should be larger than the height of the gate mark G and is, for instance, about 0.5 mm.

In the clamp 62 with this arrangement, the inner peripheral edge of the end face 62c is chamfered to make a guide surface 62d which facilitates press-fitting the clamp 62 on the leader pin 21 and to clear the rounded portion at the base of the flanges 21d. Though not shown in the following arrangements, it is preferred that the guide surface 62d be formed.

With the arrangement described above, since the gate mark G is formed in the recess 63 on the end face 62c of the clamp 62 and does not project beyond the end face 62c, there is no fear that unsatisfactory press-fitting of the clamp 62 on the central shaft portion 21a is caused even if the clearance between the clamp 62 and the flanges 21d is narrowed. Further, movement of the magnetic tape 20 in the direction of its width is suppressed and high positional accuracy is obtained.

Figure 36:
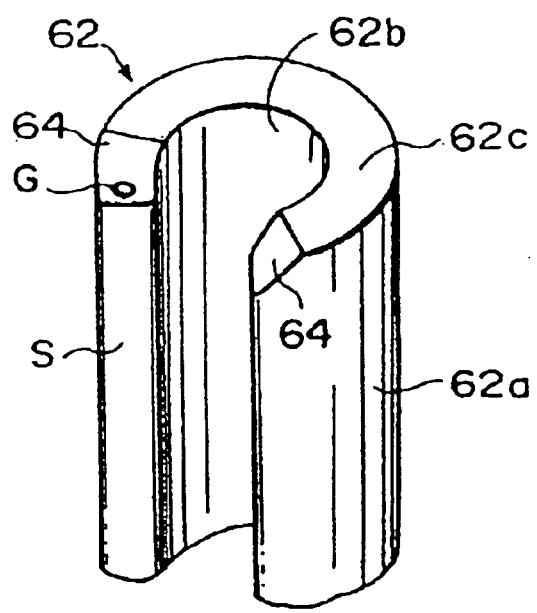

In the clamp 62 shown in FIG. 36, an end face 62c is obliquely cut on opposite sides of the slit S to form an inclined guide surface 64, and a gate mark G is formed on the inclined guide surface 64. When the clamp 62 is press-fitted on the pin body 61, the inclined guide surface 64 abuts against the flange 21d and corrects the position of the clamp 62 relative to the pin body 61, thereby facilitating press-fitting the clamp 62. The guide surface 64 is small in inclined angle and is suitable for a pinpoint gate where the gate mark is formed substantially in parallel to the gate.

Figure 37:
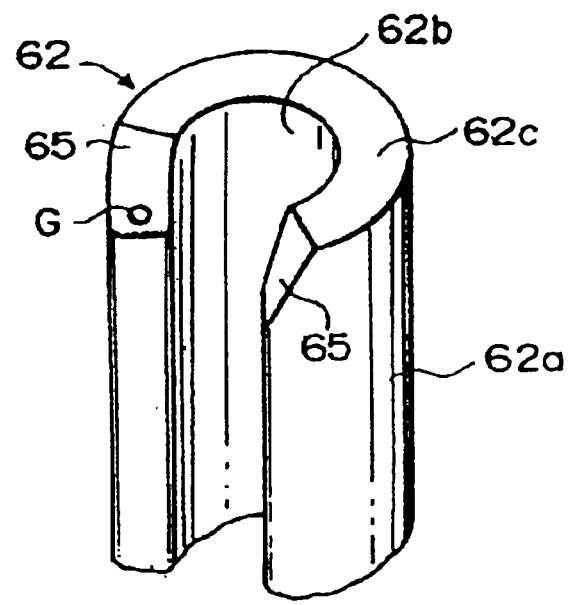

The clamp 62 shown in FIG. 37 is similar to that shown in FIG. 36 but is larger in inclination of the inclined guide surface 65. In this case, use of a submarine gate where the gate mark is formed at an angle to the axial direction of the clamp 62 is suitable.

The guide surfaces 64 and 65 in the arrangements described above are for ensuring strength (wall thickness) of the gate portion of the injection mold. It is preferred that the gate be formed so that the gate mark G is formed as remoter from the end face 62c as possible.

Also with this arrangement, since the gate mark does not project beyond the end face 62c, there is no fear that unsatisfactory press-fitting of the clamp 62 on the central shaft portion 21a is caused even if the clearance between the clamp 62 and the flanges 21d is narrowed. Further, movement of the magnetic tape 20 in the direction of its width is suppressed and high positional accuracy is obtained.

Figure 38:
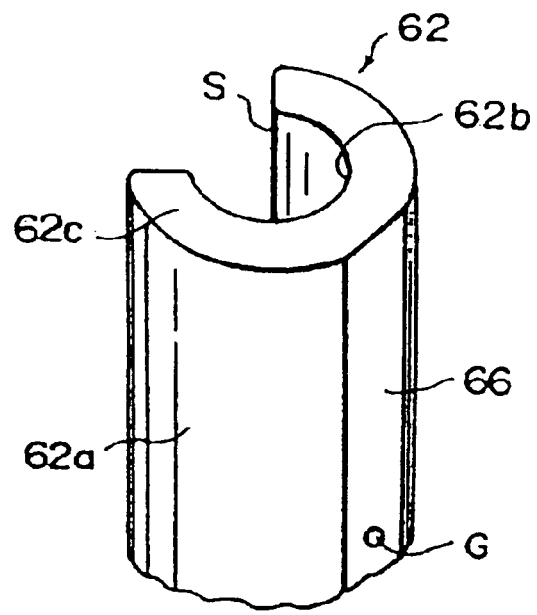

In the clamp 62 shown in FIG. 38, the outer surface 62a opposite to the slit S is cut over the entire length of the clamp 62 to form a flat surface 66 and the gate mark G is formed on the flat surface 66. When the clamp 62 is pressed at the flat surface 66 when the clamp 62 is press-fitted on the pin body 61, the clamp 62 can be stably pressed.

In this case, use of a pin point gate where a gate is formed in perpendicular to the cylindrical surface is suitable.

Figure 39:
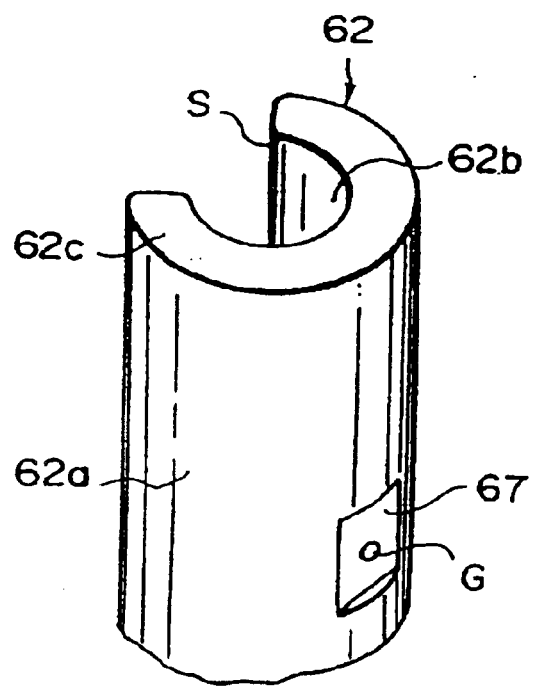

In the clamp 62 shown in FIG. 39, the outer surface 62a opposite to the slit S is partly cut to form a flat surface 67 and the gate mark G is formed on the flat surface 67. Also in this case, use of a pin point gate is suitable.

Also in the arrangements shown in FIGS. 38 and 39, the gate mark G is formed in the flat surface 66 or 67 and does not project beyond the cylindrical surface, whereby interference of the gate mark G with a component of the tape drive apparatus is avoided.

In the clamp 62 shown in FIG. 40, the inner surface 62b of the clamp 62 is thinned over the entire periphery at least at a part adjacent to one end face 62c to form a recess 68 on the inner surface 62b and the gate mark G is formed on the recess 68. In this case, use of a submarine gate where the gate mark is formed at an angle to the inner surface 62b is suitable. The recess 68 may be formed only a part of the inner surface 62b to extend in the axial direction of the clamp 62.

Also in this arrangement, the gate mark G is formed in the recess 68 and does not project beyond the inner surface 62b, and accordingly the gate mark G cannot damage the magnetic tape 20 when clamping the tape 20 on the pin body 61.

What is claimed is:

1. A magnetic tape cartridge comprising a cartridge casing formed by upper and lower casing halves connected together, and a single reel around which a magnetic tape with a leader pin fixed to the leading end thereof is wound and which is contained in the cartridge casing for rotation, the leader pin being removably held in a tape draw-out opening with its axial direction directed in the vertical direction under urging force of a spring member acting on upper and lower end portions of the leader pin sideways with the upper and lower end portions received in recesses respectively formed in the upper and lower casing halves, and the tape draw-out opening being opened and closed by a slide door wherein the improvement comprises that the slide door is provided on the back side thereof with a rib having an inclined surface which is brought into abutment against the upper surface of a head portion of the leader pin and presses downward the leader pin in response to movement of the slide door to the closing position.

* * * * *